US007729996B2

(12) United States Patent
Zito

(10) Patent No.: US 7,729,996 B2
(45) Date of Patent: Jun. 1, 2010

(54) REUSE OF AN EBP ACCOUNT THROUGH ALTERNATE AUTHENTICATION

(75) Inventor: Sean Zito, Alpharetta, GA (US)

(73) Assignee: CheckFree Corporation, Norcross, GA (US)

( * ) Notice: Subject to any disclaimer, the term of this patent is extended or adjusted under 35 U.S.C. 154(b) by 1114 days.

(21) Appl. No.: 10/879,712

(22) Filed: Jun. 30, 2004

(65) Prior Publication Data

US 2005/0119971 A1    Jun. 2, 2005

Related U.S. Application Data

(63) Continuation-in-part of application No. 10/285,691, filed on Nov. 1, 2002, now abandoned.

(51) Int. Cl.
*G06Q 20/00* (2006.01)
(52) U.S. Cl. ............... 705/76; 705/1; 705/26; 705/38; 705/40; 380/24
(58) Field of Classification Search .............. 705/76
See application file for complete search history.

(56) References Cited

U.S. PATENT DOCUMENTS

| | | |
|---|---|---|
| 3,852,571 A | 12/1974 | Hall et al. |
| 4,701,601 A | 10/1987 | Francini et al. |
| 4,734,564 A | 3/1988 | Boston et al. |
| 4,734,858 A | 3/1988 | Schlafly |
| 4,747,050 A | 5/1988 | Brachti et al. |
| 4,775,935 A | 10/1988 | Yourick |
| 4,799,156 A | 1/1989 | Shavit et al. |
| 4,812,628 A | 3/1989 | Boston et al. |
| 4,822,985 A | 4/1989 | Boggan et al. |
| 4,823,264 A | 4/1989 | Deming |
| 4,947,028 A | 8/1990 | Gorog |
| 4,961,142 A | 10/1990 | Elliott et al. |

(Continued)

FOREIGN PATENT DOCUMENTS

EP    0542298    5/1993

(Continued)

OTHER PUBLICATIONS

"Zip Merchant"—FAQ.

(Continued)

*Primary Examiner*—Pierre E Elisca
*Assistant Examiner*—Shahid Kamal
(74) *Attorney, Agent, or Firm*—Sutherland Asbill & Brennan LLP

(57) ABSTRACT

A technique for accessing an electronic commerce service is provided in which information associated with a subscriber's account with an electronic commerce service is stored along with first subscriber credentials for that subscriber to access the services. An account is created during enrollment. The enrollment is associated with a first electronic commerce participant, i.e., a biller or a payee. A request for the subscriber to access an electronic commerce service in association with a second electronic commerce participant is received. Without the subscriber, or any other entity providing the credentials, the subscriber is granted access to the requested service utilizing the account established in association with the first participant. This access is granted based upon the subscriber providing information other than credentials, the provided information being information stored by the service provider in association with the enrollment.

22 Claims, 20 Drawing Sheets

U.S. PATENT DOCUMENTS

| | | | |
|---|---|---|---|
| 4,977,595 A | 12/1990 | Ohta et al. | |
| 4,992,940 A | 2/1991 | Dworkin | |
| 5,007,084 A | 4/1991 | Materna et al. | |
| 5,021,953 A | 6/1991 | Webber et al. | |
| 5,025,373 A | 6/1991 | Keyser, Jr. et al. | |
| 5,206,488 A | 4/1993 | Teicher | |
| 5,220,501 A | 6/1993 | Lawlor et al. | |
| 5,255,182 A | 10/1993 | Adams | |
| 5,283,829 A | 2/1994 | Anderson | |
| 5,287,270 A | 2/1994 | Hardy et al. | |
| 5,319,542 A | 6/1994 | King, Jr. et al. | |
| 5,325,290 A | 6/1994 | Cauffman et al. | |
| 5,326,959 A | 7/1994 | Perezza | |
| 5,336,870 A | 8/1994 | Hughes et al. | |
| 5,383,113 A | 1/1995 | Kight et al. | |
| 5,420,405 A | 5/1995 | Chasek | |
| 5,428,684 A | 6/1995 | Akiyama et al. | |
| 5,453,601 A | 9/1995 | Rosen | |
| 5,455,407 A | 10/1995 | Rosen | |
| 5,465,206 A | 11/1995 | Hilt et al. | |
| 5,473,143 A | 12/1995 | Vak et al. | |
| 5,477,038 A | 12/1995 | Levine et al. | |
| 5,483,445 A | 1/1996 | Pickering | |
| 5,500,513 A | 3/1996 | Langhans et al. | |
| 5,504,677 A | 4/1996 | Pollin | |
| 5,557,516 A | 9/1996 | Hogan | |
| 5,557,518 A | 9/1996 | Rosen | |
| 5,590,197 A | 12/1996 | Chen et al. | |
| 5,613,012 A | 3/1997 | Hoffman et al. | |
| 5,649,117 A | 7/1997 | Landry | |
| 5,655,089 A | 8/1997 | Bucci | |
| 5,677,955 A | 10/1997 | Doggett et al. | |
| 5,692,132 A | 11/1997 | Hogan | |
| 5,699,528 A | 12/1997 | Hogan | |
| 5,710,887 A | 1/1998 | Chelliah et al. | |
| 5,710,889 A | 1/1998 | Clark et al. | |
| 5,715,314 A | 2/1998 | Payne et al. | |
| 5,717,989 A | 2/1998 | Tozzoli et al. | |
| 5,724,424 A | 3/1998 | Gifford | |
| 5,727,163 A | 3/1998 | Bezos | |
| 5,727,249 A | 3/1998 | Pollin | |
| 5,729,594 A | 3/1998 | Klingman | |
| 5,732,400 A | 3/1998 | Mandler et al. | |
| 5,794,221 A | 8/1998 | Egendorf | |
| 5,832,460 A | 11/1998 | Bednar et al. | |
| 5,873,072 A | 2/1999 | Kight et al. | |
| 5,884,288 A | 3/1999 | Chang et al. | |
| 5,920,847 A | 7/1999 | Kolling et al. | |
| 5,920,848 A | 7/1999 | Schutzer et al. | |
| 5,943,656 A | 8/1999 | Crooks et al. | |
| 5,949,043 A | 9/1999 | Hayashida | |
| 5,956,700 A | 9/1999 | Landry | |
| 5,963,925 A | 10/1999 | Kolling et al. | |
| 5,966,698 A | 10/1999 | Pollin | |
| 5,970,475 A * | 10/1999 | Barnes et al. | 705/27 |
| 5,974,146 A | 10/1999 | Randle et al. | |
| 5,978,780 A | 11/1999 | Watson | |
| 6,003,762 A | 12/1999 | Hayashida | |
| 6,021,491 A | 2/2000 | Renaud | |
| 6,029,150 A | 2/2000 | Kravitz | |
| 6,032,133 A | 2/2000 | Hilt et al. | |
| 6,035,281 A * | 3/2000 | Crosskey et al. | 705/14 |
| 6,035,285 A | 3/2000 | Schlect et al. | |
| 6,044,362 A | 3/2000 | Neely | |
| 6,049,786 A | 4/2000 | Smorodinsky | |
| 6,055,513 A | 4/2000 | Katz et al. | |
| 6,055,567 A | 4/2000 | Ganesan et al. | |
| 6,070,150 A | 5/2000 | Remington et al. | |
| 6,078,907 A | 6/2000 | Lamm | |
| 6,085,169 A | 7/2000 | Walker et al. | |
| 6,098,053 A | 8/2000 | Slater | |
| 6,125,349 A | 9/2000 | Maher | |
| 6,128,603 A | 10/2000 | Dent et al. | |
| 6,173,272 B1 * | 1/2001 | Thomas et al. | 705/42 |
| 6,188,994 B1 | 2/2001 | Egendorf | |
| 6,195,420 B1 | 2/2001 | Tognazzini | |
| 6,208,979 B1 | 3/2001 | Sinclair | |
| 6,263,447 B1 | 7/2001 | French et al. | |
| 6,285,991 B1 | 9/2001 | Powar | |
| 6,289,322 B1 | 9/2001 | Kitchen et al. | |
| 6,292,789 B1 * | 9/2001 | Schutzer | 705/40 |
| 6,304,857 B1 | 10/2001 | Heindel et al. | |
| 6,311,170 B1 | 10/2001 | Embrey | |
| 6,317,745 B1 | 11/2001 | Thomas | |
| 6,374,229 B1 | 4/2002 | Lowrey et al. | |
| 6,493,685 B1 | 12/2002 | Ensel et al. | |
| 6,618,708 B1 | 9/2003 | Sakamoto et al. | |
| 6,711,682 B1 | 3/2004 | Capps | |
| 6,721,716 B1 | 4/2004 | Gross | |
| 6,856,974 B1 | 2/2005 | Ganesan et al. | |
| 6,889,205 B1 | 5/2005 | Lamm | |
| 6,934,691 B1 | 8/2005 | Simpson et al. | |
| 6,947,908 B1 | 9/2005 | Slater | |
| 6,952,770 B1 | 10/2005 | Mittal et al. | |
| 7,107,249 B2 | 9/2006 | Dively et al. | |
| 7,158,955 B2 | 1/2007 | Diveley et al. | |
| 7,177,830 B2 * | 2/2007 | Shields et al. | 705/35 |
| 7,395,243 B1 | 7/2008 | Zielke et al. | |
| 2001/0032181 A1 | 10/2001 | Jakstadt et al. | |
| 2001/0037295 A1 | 11/2001 | Olsen | |
| 2001/0044787 A1 * | 11/2001 | Shwartz et al. | 705/78 |
| 2001/0054020 A1 | 12/2001 | Barth et al. | |
| 2001/0056390 A1 | 12/2001 | Varadarajan et al. | |
| 2002/0002536 A1 | 1/2002 | Braco | |
| 2002/0007320 A1 | 1/2002 | Hogan et al. | |
| 2002/0013768 A1 | 1/2002 | Ganesan | |
| 2002/0019808 A1 | 2/2002 | Sharma | |
| 2002/0023055 A1 | 2/2002 | Antognini et al. | |
| 2002/0023059 A1 | 2/2002 | Bari et al. | |
| 2002/0029248 A1 | 3/2002 | Cook et al. | |
| 2002/0029249 A1 | 3/2002 | Campbell et al. | |
| 2002/0046168 A1 | 4/2002 | Kitchen | |
| 2002/0055850 A1 * | 5/2002 | Powell et al. | 705/1 |
| 2002/0059139 A1 | 5/2002 | Evans | |
| 2002/0065772 A1 | 5/2002 | Saliba et al. | |
| 2002/0069163 A1 | 6/2002 | Gilbert | |
| 2002/0069168 A1 | 6/2002 | Lee et al. | |
| 2002/0077889 A1 * | 6/2002 | Kolls | 705/14 |
| 2002/0095387 A1 | 7/2002 | Sosa et al. | |
| 2002/0120563 A1 * | 8/2002 | McWilliam et al. | 705/39 |
| 2002/0120628 A1 | 8/2002 | Hitchcock et al. | |
| 2002/0165936 A1 | 11/2002 | Alston et al. | |
| 2003/0004834 A1 | 1/2003 | Yamazaki | |
| 2003/0004867 A1 | 1/2003 | Kight et al. | |
| 2003/0036930 A1 | 2/2003 | Matos et al. | |
| 2003/0074269 A1 * | 4/2003 | Viswanath | 705/26 |
| 2003/0139996 A1 | 7/2003 | D'Antoni et al. | |
| 2003/0145018 A1 | 7/2003 | Hitchcock et al. | |
| 2003/0167277 A1 | 9/2003 | Hejlsberg et al. | |
| 2003/0208441 A1 | 11/2003 | Poplawski | |
| 2003/0212642 A1 * | 11/2003 | Weller et al. | 705/67 |
| 2004/0064409 A1 | 4/2004 | Kight et al. | |
| 2004/0078329 A1 | 4/2004 | Kight et al. | |
| 2004/0083167 A1 * | 4/2004 | Kight et al. | 705/40 |
| 2004/0083171 A1 | 4/2004 | Kight et al. | |
| 2004/0088235 A1 * | 5/2004 | Ziekle et al. | 705/34 |
| 2004/0133509 A1 * | 7/2004 | McCoy et al. | 705/39 |
| 2004/0133514 A1 * | 7/2004 | Zielke et al. | 705/40 |
| 2004/0139005 A1 | 7/2004 | Ganesan | |
| 2004/0143548 A1 | 7/2004 | Meier et al. | |
| 2004/0167853 A1 | 8/2004 | Sharma | |
| 2004/0199574 A1 | 10/2004 | Franco et al. | |
| 2004/0236584 A1 | 11/2004 | Kuebert et al. | |
| 2005/0010523 A1 | 1/2005 | Myklebust et al. | |

| | | | |
|---|---|---|---|
| 2005/0033690 A1 | 2/2005 | Antognini et al. | |
| 2005/0119971 A1* | 6/2005 | Zito | 705/40 |
| 2005/0154649 A1* | 7/2005 | Jalili | 705/26 |
| 2005/0197957 A1 | 9/2005 | Keith et al. | |
| 2005/0209965 A1 | 9/2005 | Ganesan | |
| 2005/0222953 A1 | 10/2005 | Ganesan et al. | |
| 2005/0246550 A1 | 11/2005 | Orbke et al. | |
| 2006/0059107 A1* | 3/2006 | Elmore et al. | 705/64 |
| 2007/0022052 A1 | 1/2007 | Ganesan et al. | |
| 2007/0225999 A1* | 9/2007 | Powell et al. | 705/1 |

FOREIGN PATENT DOCUMENTS

| | | |
|---|---|---|
| EP | 0745947 | 5/1993 |
| EP | 1043668 | 5/1993 |
| EP | 1049056 | 5/1993 |
| EP | 1136923 | 9/2003 |
| EP | 1361533 | 11/2003 |
| GB | 2102606 | 2/1983 |
| WO | 9116691 | 10/1991 |
| WO | 9905628 | 2/1999 |
| WO | 9910823 | 3/1999 |
| WO | 0048103 | 8/2000 |
| WO | 0152142 | 7/2001 |
| WO | 0171973 | 9/2001 |
| WO | 0186558 | 11/2001 |

OTHER PUBLICATIONS

Eview Security Overview.
Harris Bill Payment & Presentment Enrollment Help.
Final Office Action dated Jan. 28, 2008 for related U.S. Appl. No. 10/285,664, filed Nov. 1, 2002.
Final Office Action dated Jan. 22, 2008 for related U.S. Appl. No. 10/285,691, filed Nov. 1, 2002.
Final Office Action dated Jan. 10, 2008 for related U.S. Appl. No. 10/285,706, filed Nov. 1, 2002.
Non-Final Office Action dated Dec. 31, 2007 for related U.S. Appl. No. 10/400,081, filed Mar. 27, 2003 which is a continuation-in-part of U.S. Appl. No. 10/285,706.
Non-Final Office Action dated Dec. 13, 2007 for related U.S. Appl. No. 10/285,663, filed Nov. 1, 2002.
Notice of Allowance dated Mar. 18, 2008 for related U.S. Appl. No. 10/285,662, filed Nov. 1, 2002.
Final Office Action dated Mar. 20, 2008 for related U.S. Appl. No. 10/285,708, filed Nov. 1, 2002.
Non-Final Office Action mailed May 29, 2008 for related U.S. Appl. No. 11/139,627, filed May 31, 2005 which a divisional of U.S. Appl. No. 09/734,694.
Levine, Shira. "Billing with an Attitude." America's Network, p. 78. (Dialog File 6, 05424287).
Disclosure Under 37 C.F.R. 156.
"Open Financial Exchange Bill Presentment." Open Financial Exchange Specification. Collaborative work of CheckFree Corp., Microsoft Corp. and Intuit, Inc., Jun. 12, 1997, pp. 312-356.
Business Task Force of NACHA's Council for Electronic Billing and Payment. "An Overview of Electronic Bill Presentment and Payment Operating Models." Apr. 9, 1999, pp. 1-12.
"CheckFree and Equifax Launch Electronic Billing and Payment—More Than 50 Financial Institutions Rollout Service." PR Newswire, Aug. 25, 1999, p. 1.
Osberg, Sharon, "Wells Fargo, Standards-based Electronic Bill Presentment and Payment (EBPP)." Sun Microsystems, Nov. 1999.
Council for Electronic Billing and Payment of the National Automated Clearing House Association (NACHA). "Electronic Bill Payment/Presentment Business Practices." Dec. 7, 1999, vol. 2.0.
Gralla, Preston. "How the Internet Works." Que, Sep. 7, 2001, 6th ed., pp. 148-151.
Coulter, Cuan. "E-Business: Account Aggregation." Dec. 31, 2001, pp. 1-6.
"Interactive Financial Exchange." Business Method Specification, IFX Forum, Inc., Jun. 2, 2002, pp. 8-1-8-21.
Fay, D. "An Architecture for Distributed Applications on the Internet: Overview of Microsoft's .NET Platform." Proceedings of the International Parallel and Distributed Processing Symposium, Apr. 22, 2003, pp. 90-96.
"European Search Report," European Patent App. No. 04006976, European Patent Office, Mar. 2, 2005.
"European Search Report," European Patent App. No. 04009973, European Patent Office, Sep. 8, 2004.
"European Search Report," European Patent App. No. 04009974, European Patent Office, Oct. 22, 2004.
"European Search Report," European Patent App. No. 04009975, European Patent Office, Oct. 28, 2004.
"European Search Report," European Patent App. No. 04009976, European Patent Office, Nov. 24, 2004.
"European Search Report," European Patent App. No. 04010334, European Patent Office, Feb. 2, 2005.
"European Search Report," European Patent App. No. 04010336, European Patent Office, Feb. 28, 2005.
Non-Final Office Action dated Nov. 30, 2005, for related U.S. Appl. No. 09/734,694, filed Dec. 13, 2000.
Final Office Action dated Nov. 6, 2007, for related U.S. Appl. No. 10/397,836, filed Mar. 27, 2003, which is a Continuation-in-Part of U.S. Appl. No. 10/285,669.
Non-Final Office Action mailed Aug. 13, 2008 for related U.S. Appl. No. 10/285,706, filed Nov. 1, 2002.
Notice of Allowance mailed Dec. 9, 2008 for related U.S. Appl. No. 10/285,706, filed Nov. 1, 2002.
Non-Final Office Action mailed May 26, 2006 for U.S. Appl. No. 09/734,694, filed Dec. 13, 2000, which is a continuation-in-part of U.S. Appl. No. 09/298,889.
Non-Final Office Action mailed Jul. 9, 2009 for related U.S. Appl. No. 10/397,834, filed Mar. 27, 2003, which is a continuation-in-part of U.S. Appl. No. 10/285,706.
Non-Final Office Action mailed Jul. 20, 2009 for related U.S. Appl. No. 11/139,627, filed May 31, 2005, which is a divisional of U.S. Appl. No. 09/734,694.
"Microsoft Tries for Lead in Billing." Phillips Business Information, Feb. 27, 1998, vol. 3, issue 4, pp. 1-4.

* cited by examiner

UPN Biller Direct UI

Pay ACME

Account Balance: 139.00
Amount Due 139.00
Due Date: 7/15/2003

Payment Date: 7/15/2003

Payment Amount: 139.00

Type of Account: Checking Account

New? Enter your payment account information to pay

YOUR NAME
Your Address
Your City, State, Zip

Pay To The
Order of $ _____ Dollars

Date _____

Memo _____
000000000  00 00  000000000000  0123

Look here to find your 9-digit routing transit number and enter it below

Look here to find your account number and enter it below

Confirm RTN: _____  — 1303A

Confirm Account Number: _____  — 1303B

Email Adress _____

Click to pay >> (Pay) — 1304

If you're already enrolled, click here to sign in and complete your payment... — 1302

REUSE OF AN EBP ACCOUNT THROUGH ALTERNATE AUTHENTICATION

RELATED APPLICATIONS

This application is a Continuation-In-Part of U.S. patent application Ser. No. 10/285,691, filed on Nov. 1, 2002 and entitled "A TECHNIQUE FOR CUSTOMIZING ELECTRONIC COMMERCE USER PRESENTATIONS", the subject matter of which is incorporated by reference herein.

This application is also related to U.S. patent application Ser. No. 10/285,706, filed on Nov. 1, 2002 and entitled "MATCHING CONSUMERS WITH BILLERS HAVING BILLS AVAILABLE FOR ELECTRONIC PRESENTMENT"; U.S. patent application Ser. No. 10/285,707, filed on Nov. 1, 2002 and entitled "EASY USER ACTIVATION OF ELECTRONIC COMMERCE SERVICES"; U.S. patent application Ser. No. 10/285,666, filed on Nov. 1, 2002 and entitled "SELECTIVE NOTICING OF AVAILABILITY OF AN ELECTRONIC BILL BASED ON SERVICE PROVIDER DATA"; U.S. patent application Ser. No. 10/285,669, filed on Nov. 1, 2002 and entitled "SELECTIVE NOTICING OF AVAILABILITY OF AN ELECTRONIC BILL"; U.S. patent application Ser. No. 10/285,664, filed on Nov. 1, 2002 and entitled "AN IDENTITY PROTECTION TECHNIQUE IN MATCHING CONSUMERS WITH ELECTRONIC BILLERS"; U.S. patent application Ser. No. 10/285,709, filed on Nov. 1, 2002 and entitled "IDENTIFYING CANDIDATE BILLERS OR PAYEES OF A PAYOR"; U.S. patent application Ser. No. 10/285,667, filed on Nov. 1, 2002 and entitled "EASY ESTABLISHMENT OF BILLER OR PAYEES OF A PAYOR"; U.S. patent application Ser. No. 10/285,663, filed on Nov. 1, 2002 and entitled "A TECHNIQUE FOR MAKING PAYMENTS FOR A NON-SUBSCRIBER PAYOR"; U.S. patent application Ser. No. 10/285,708, filed on Nov. 1, 2002 and entitled "DISTRIBUTED MATCHING OF CONSUMERS WITH BILLERS HAVING BILLS AVAILABLE FOR ELECTRONIC PRESENTMENT"; U.S. patent application Ser. No. 10/058,781, filed on Jan. 3, 2002 and entitled "A TECHNIQUE FOR PRESENTING MATCHED BILLERS TO A CONSUMER"; U.S. patent application Ser. No. 10/397,836, filed on Mar. 27, 2003 and entitled "A REDUCED COMMUNICATION TECHNIQUE FOR MATCHING ELECTRONIC BILLERS AND CONSUMERS"; U.S. patent application Ser. No. 10/397,834, filed on Mar. 27, 2003 and entitled "A TECHNIQUE FOR IDENTIFYING PROBABLE BILLERS OF A CONSUMER"; and U.S. patent application Ser. No. 10/400,081, filed on Mar. 27, 2003 and entitled "A TECHNIQUE FOR IDENTIFYING PROBABLE BILLERS OF A CONSUMER", the subject matter of each of which is incorporated by reference herein.

FIELD OF THE INVENTION

The present invention relates to electronic commerce, and more particularly to increasing adoption of electronic billing and payment services by consumers.

BACKGROUND OF THE INVENTION

Electronic billing and payment (EBP) is widely available today due to the proliferation of the Internet and ubiquity of consumer computing devices. However, EBP acceptance by consumers has generally been by early adopters. The remaining members of the potential consumer base are aware of EBP, but have not yet availed themselves of the advantages of electronic billing and payment. Adoption of EBP has been split between biller direct scenarios and service provider (an aggregation point of EBP services) scenarios, each to be discussed in detail further below. There are barriers that, if addressed, can substantially increase the number of both consumers making up the EBP consumer base and EBP transactions, both in biller direct and service provider scenarios.

FIGS. 1A and 1B show current models of EBP services. FIG. 1A shows the Biller Direct model. FIG. 1B shows the Service Provider (SP) model. The Biller Direct model includes multiple electronic billers A' through M'. Each of these electronic billers A' through M' maintains their own electronic billing enrollment and activation data, shown as databases 101 through 102. In the Biller Direct model enrollment and activation is a single process. A consumer 105 interacts with each of electronic billers A' through M' separately to begin receipt of electronic bills. Prior to enrollment and activation of electronic billing, each electronic biller A' through M' maintains information about each of their customers in databases 101 through 102. This is common information maintained by billers about customers. The consumer 105 must request to receive bills by providing enrollment and activation data, in addition to the information already maintained, to all electronic billers A' through M'. Enrollment and activation data is provided via communications channels 106A through 106M. The consumer provided enrollment and activation data for electronic billers A' through M' is very similar, typically merely consumer identifying information such as the consumer's name, in addition to perhaps other consumer identifying information such as address, phone number, etc. It should be noted that at least some of this information is often merely confirmation of information the biller already has, as the enrolling consumer is, after all, already a customer. Thus, the consumer 105 ends up providing the same or similar data to each of electronic billers A' through M'.

The provided consumer identifying enrollment and activation data for electronic billing can include any or all of consumer name, phone number, billing address, and perhaps a service address, depending on the type of electronic biller. In addition, a consumer 105 may be required to provide an account number with each particular electronic biller from which electronic billing is being activated. Some electronic billers require an enrolling consumer to provide identity confirming information that is not typically publicly known, such as social security number (SSN) or mother's maiden name. Many electronic billers require the same identity confirming information. It will be apparent that in enrollment and activation via the Web the consumer 105 has to access Web sites hosted by each of these multiple electronic billers A' through M' to provide enrollment and activation data at every single electronic biller Web site. Typically, the only different (unique) piece of information required by each electronic biller is the account number, because, as known, these differ by biller.

FIG. 1A also shows the consumer 105 enrolling for making on-line (electronic) payments to biller A' through biller Z'. Enrollment is shown via communications channels 108A through 108Z. Enrollment for making electronic payments may be separate from enrollment for electronic billing in the typical Biller Direct EBP system. Required consumer supplied enrollment data for electronic payments is, here again, similar in nature among various electronic billers (payees), and typically includes funding account information. Each of electronic billers A' through Z' stores enrollment data for on-line payments in separate data repositories, 110 through 111, than those in which enrollment data for electronic billing is stored, 101 through 102. Typically, the enrollment data for making electronic payments is not linked to or otherwise shared with the enrollment data for receiving electronic billing, as shown by the separate electronic billing data repositories 101 through 102 and electronic payments data repositories 110 through 111. It should be noted that not all electronic billers offer electronic payments, and that not all billers offering electronic payments offer electronic billing.

In a Biller Direct model there are multiple ways that electronic payments can be performed. In one, an electronic biller A' through Z' provides all the functionality for completing the payment. That is, an electronic biller presents a user interface for payment via a communications channel 108A through 108Z, captures enrollment data for payments from the consumer 105, stores payment requests in data repositories 110 through 111, processes the payment requests, and issues all debits, credits, and remittance advice associated with payment requests.

In another way that electronic payments can be performed, a biller K' through Z' shares the functionality for completing payments. A biller outsources at least the actual payment processing and optionally also the payment user interface to a service provider, not shown in FIG. 1A. There are multiple variations as to whether the biller or the service provider captures enrollment data for payments and whether the biller or the service provider warehouses payment requests. In any event, a service provider processes the payment requests and issues all debits, credits, and remittance advice associated with the payment requests.

In enrollment for on-line payment, the consumer 105 typically provides, for each payee (billers K' through Z'), customer name, customer address, phone number, and information identifying a funding account from which payment will be made. With some billers it is not necessary for a consumer to provide name, address, and account number information if that consumer is already enrolled for electronic billing. The consumer need only supply funding account information. This same information is required for payment to each payee. The different piece of information, among payees, as above, is the consumer's unique account number associated with each payee. In the Biller Direct model of FIG. 1A, the consumer 105 has to enter similar or the same data for every electronic biller, whether electronic bill receipt or on-line (electronic) payment is desired. Thus, existing EBP enrollment and activation processes are very redundant.

Accordingly, a need exists for an efficient enrollment and activation technique in the Biller Direct model of electronic billing and payment.

FIG. 1B shows an EBP model in which a service provider (SP) 120 is the primary connection for a consumer 115 to reach electronic billers and/or payees. This is known as a SP model. In the SP model enrollment and activation are separate processes. As shown in FIG. 1B, a consumer 115 communicates via communications channel 130 with a SP 120. The consumer 115 enrolls with SP 120, not individual electronic billers A through M. Shown from SP 120 are communications channels 142A through 142M to electronic billers A through M. Thus, one of the advantages for the consumer 115 in this model is that enrollment data is only entered once. Enrollment data is stored in enrollment database 135 by the SP 120. This core enrollment data includes the consumer's name and address and other key consumer identifying information. While the consumer 115 is only required to enter enrollment data once, the consumer 115 must enter activation data for electronic billing for each electronic biller. This activation data often includes part of, or even all of, the same data as required for enrollment.

Also shown in FIG. 1B are multiple instances of stored activation data 140A-140N. This reflects the fact that even though the consumer 115 has enrolled once with the SP 120, he or she is still required to activate receipt of electronic billing for each of electronic billers A through M separately. The consumer 115 has to enter activation data for each biller. Thus, for electronic biller A, consumer 115 is required to enter activation information such as social security number, mother's maiden name, etc. Further, consumer 115 has to continue to enter this information, or variations thereof, each time they activate a new e-Bill from a different electronic biller in this model. To begin activation, the SP 120 typically presents a list of all the billers for which the SP 120 presents bills. The consumer 115 selects those billers he or she wishes to activate and provides the required information for each. The service provider 120 then transmits an activation notice to each selected biller informing the biller to begin to provide bills to the SP 120 for presentment to the consumer 115.

In the SP model of EBP services the consumer 115 has the capability within one site to enroll for and review multiple electronic bills. This diagram also depicts a data store 150 associated with the SP 120 labeled "Other Subscriber Data". This reflects the fact that consumer 115 can also access the SP 120 to pay billers other than electronic billers A through M, because this "Other Subscriber Data" includes payment data.

Different SPs offer one or more of at least three different payment models. A first is a 'closed payee list—electronic biller' model in which only electronic billers presenting electronic bills through a SP can be paid. That is, the only payees available are electronic billers. A second model is a 'closed payee list—electronic biller and managed payee' model in which electronic billers as well as payees with which the SP has a relationship can be paid. A third model is an 'open payee list' model. In an 'open payee list' model, consumers who enroll for EBP services can pay any payee.

Referring back again to the Biller Direct Model, as discussed above, consumers have to enroll in multiple places to make electronic payments and/or receive electronic bills. In addition to the problems discussed above, consumers have to remember which sites at which they have enrolled, as well as multiple site ID and password combinations. Because of different site requirements a consumer may not be able to obtain a desired ID/password combination. Also, a desired ID/password combination may be unavailable because it is already in use by another consumer. So, yet another barrier to the making of electronic payments and/or the receipt of electronic bills is that consumers have multiple Web sites they have to access to make payments as well as multiple Web sites to access to see bills and/or payment history. Each of these sites requires ID/password combinations. A consumer must have available the correct ID/password combinations upon each visit to a Web site.

One of the solutions to the problem of multiple user IDs and passwords is found in the on-line retail market. However, the solution only applies to electronic payments, not electronic billing. Today there is known a third party payment service provider which supplies payment services which are accessed via a payment link that is found in multiple Web sites operated by disparate on-line retailers. That is, multiple unrelated retail Web sites each have a link to a single payment service provider Web site. A consumer has to only enroll once for this third party payment service. The on-line retailers provide the link for the consumer to access this payment capability. Once the link is activated, the consumer's browser then is redirected to a third party hosted Web site in order to enter payment information.

In FIG. 2 are shown blocks 205A-205N, each representing one of multiple Web sites a consumer could go to make payments using this third party payment service. Shown are an auction Web site 205A, a retailer A Web site 205B, retailer B Web site 205C, retailer Web site C 205D, and a Web site of the third party payment service provider itself 205N. At each one of these Web sites 205A-205N there is a payment link 210A-210N that represents the third party payment provider. Once activated by a consumer, the consumer's browser is redirected to a payment Web site 201 hosted by that third party provider and branded as the third party provider. Of course, with link 210N a consumer is already visiting a web site of the third party payment provider. The payment Web site 201 is not branded based on the site from which the consumer may be making a purchase, nor is any of links 210A, 210B, 210C, or 210D branded based upon the Web site at which each respective link is found. Once the consumer has entered payment information at the third party payment service provider, then it is up to the third party payment service provider to feed information associated with the payment back to a seller from which a purchase was made.

The third party payment service provider does provide a single view of all of transactions for a given consumer. The consumer can go directly to the third party payment service provider in order to see all of his or her payment history as well as make payments. This provides the same user experience no matter where the consumer is activating a payment link 210A-210N. However, it should be noted that the third party payment service provider only offers a closed payee list. That is, only certain payees can be paid, those having a business relationship with the third party payment service provider. This third party payment service has a one-time enrollment feature and the consumer uses the same user ID and password no matter the Web site from which the payment link 210A-210N is activated.

The third party payment service provider technique of FIG. 2 works well in the retail environment, however it does not work well for companies who feel their brand is very important with their customers and would like a user experience to be the same whether the consumer is viewing an e-bill at the company's site, or doing anything else from the company's site, including paying a bill or making a purchase. In order to have a branded environment today, there are isolated silos of EBP activity such that a consumer has to go to multiple sites and have multiple user names and passwords in order for entities to have branded environments and otherwise control the user experience.

A tension exists between providing biller branded environments and a user being associated with a single network user ID and password combination that is usable across various biller branded and unbranded sites. That is, a user, because of biller branding, might not realize that that he or she is already enrolled to access electronic commerce services, based upon an enrollment at a first biller branded site, when visiting a second site that may or may not be biller branded, and vice-versa. Additionally, the user may not have access credentials to log on from the first site, if, for example, such was assigned in a consolidated log on context from a second site and never provided back to the user.

FIG. 3 will be utilized to show problems arising from this tension. It should be noted that FIG. 3 is merely exemplary in that a consumer is shown accessing a biller site to view a bill, and then a payment functionality site to pay that bill. The first site could be one of many types of sites, as shown later in FIG. 11, at which content may be viewed or functionality accessed. The second site, to which the consumer is redirected, could offer any type of EBP functionality in support of the first site. That is, the consumer could access a first site to make a payment, and be redirected to a second site to complete the payment or view a bill. Also, the consumer could access a first site to view a bill, and be redirected to a second site to complete the bill viewing.

As shown in FIG. 3, a consumer 301 accesses electronic bills though individual biller Web sites using a Web-enabled client, most typically a Web browser 305. FIG. 3 shows two biller sites, site 307 associated with biller 1, and site 310 associated with biller 2. It should be noted that one or both could be biller direct sites, or a service provider could host one or both. In the example of FIG. 3, both Biller 1 site 307 and Biller 2 site 310 are biller direct sites. Whether biller branded or not, the consumer 301 must log on at each of Biller 1 site 307 and Biller 2 site 310 to view his bills.

In order to pay an electronically presented bill, each one of Biller 1 and Biller 2 "hands off" a user session to a payment functionality Web site 315 provided by a service provider to capture a payment request and to perform payment processing. In doing so, either of Biller 1 and Biller 2 may perform a "consolidated log on" to the payment functionality site 315 so the consumer 301 does not have to explicitly log on again. That is, a biller provides consumer-specific access credentials to the payment functionality site 315. Further, the consumer 301 may not even be aware of a handoff. Alternatively, a direct log on procedure may be utilized by either or both Biller 1 and Biller 2 where the consumer 301 actively provides access credentials (typically a user ID and password combination) to the payment functionality site 315. Direct log on is also known as explicit, or dual, log on.

More particularly, FIG. 3 depicts biller direct sites 307 and 310 in which a biller presents billing information, but payment processing is performed by a service provider which presents payment functionality site 315. At 1 the consumer 301 accesses the Biller 1 Web site 307 via the Web browser 305. Biller 1 presents an authentication screen prior to permitting access to at least billing information. The first time the consumer 301 accesses the Biller 1 Web site 307, the consumer 301 must go through the enrollment process to establish a Biller 1-specific log on ID/password combination in order to view billing information. In subsequent visits to the Biller 1 Web site 307, the consumer 301 merely has to log on by supplying the Biller 1-specific log on ID/password combination. After successful enrollment, Biller 1 presents billing information to the consumer 301 (via the consumer's Web browser 305). In association with this presentation is a link to payment functionality site 315.

When the consumer 301 selects the link to the payment functionality site 315 the flow shown at 2 is invoked. At 2, Biller 1 redirects the Web browser 305 to the payment functionality site 315. This "handoff" includes a number of parameters, typically including payment particulars to identify the source entity performing the handoff and often to populate a payment request screen. Also, for consolidation log on sites, additional parameters supporting the consolidated log on with the payment functionality site 315 are typically included, such as a signature of Biller 1 to indicate this handoff is truly coming from Biller 1 and can be trusted, and Biller 1-specific payment functionality site 315 access credentials for the consumer 301. These Biller 1-specific access credentials for the payment functionality site 315 could be the same as, or different than Biller 1-specific ID/password combination for the consumer to access the biller 1 site 307.

The first time handed off to the payment functionality site 315 from Biller 1, the consumer 301 must enroll in the payment functionality site 315. For direct log on, payment functionality site 315 access credentials, typically consisting of an ID/password combination, are created, typically by the consumer 301, to access the payment functionality site 315. Also typically, the ID/password combination is not shared with Biller 1 site 307 (the source site). For consolidated log on, payment functionality site 315 access credentials, which may consist of an ID/password combination, an ID, a digital signature, or another cryptographic token, are created, typically by the biller and included in the handoff. Also for consolidated log on, if Biller 1 does not supply Biller 1-specific payment functionality site 315 access credentials in the handoff, enrollment includes site 315 providing back to Biller 1 site 307 access credentials to be utilized in subsequent handoffs of the consumer 301.

The tension lies in that it is highly unlikely that, in a direct log on context, the consumer 301 will recognize the fact that previously established credentials associated with direct logon may be used when accessing the payment functionality site 315 from another associated biller direct (or even another other type) site. Furthermore, if the payment functionality site 315 is first reached via a consolidated log on from a biller direct site, the payment functionality site 315 access credentials typically are never provided back to the consumer 301. Thus, even if he recognized that he had previously enrolled with site 315, he would not have access credentials to supply. Accordingly, he would be forced to re-enroll. Thus, the first time the payment functionality site 315 is accessed, for instance from the Biller 1 site 307, the consumer 301 must go through a payment functionality site 315 enrollment process, which involves providing personal information, including funding account information, and beneficially going through an identity verification and/or credit verification process, sometimes referred to as validation.

In a consolidated log on context, after the consumer has initially enrolled with the payment functionality site 315, through the Biller 1 site 307, the consumer 301 is able to bypass log on processing during a Biller 1 site 307 handoff, and instead is presented with a payment request screen from the payment functionality site 315, thus providing a relatively seamless experience between the Biller 1 Web site 307 and the payment functionality Web site 315. In a direct log on context, the consumer 307 has to log on with his payment functionality site 315 credentials in a subsequent visit, but still experiences a Biller 1-branded look-and-feel to the payment functionality site 315.

At some point in time after the operations of 1 and 2, at 3 the consumer 301 accesses the Web site of Biller 2 through Web browser 305. Biller 2 also utilizes the payment functionality site 315, although the consumer 301 may not realize that. The interaction between the consumer 301 and Biller 2 is the same as described in 1 for Biller 1. The consumer 301 establishes a Biller 2-specific log on ID/password combination for accessing the billing information on the Biller 2 Web site 310. It is certainly possible that the consumer 301 is able to establish the same log on ID and password as was used for the Biller 1 site 307, but the Biller 1 and Biller 2 systems are distinct. As in 1, the consumer 301 selects a link to the payment functionality site 315, and Biller 2 hands off the user session to the payment functionality site 315.

In 4, the consumer-payment functionality interaction is similar to that depicted in 2. Thus, if the Biller 2 site 310 practices consolidated log on with the payment functionality site 315, the first time site 315 is accessed by the consumer 301 via Biller 2 site 310, the consumer 301 will not be recognized by site 315 because no payment functionality site 315-recognized access credentials will be included in the handoff from the Biller 2 site 310. If the Biller 2 site 310 practices direct log on, the consumer 301 may not realize that access credentials established earlier through Biller 1, assuming the Biller 1 site 307 also practices direct log on, can be used here. If the Biller 2 site 310 practices consolidated log on, the consumer 301 may not have the access credentials established earlier through Biller 1, assuming the Biller 1 site 307 practices consolidated log on, and additionally may not realize that such credentials could be used here, even if the consumer 301 did possess those access credentials. Hence, the consumer 301 proceeds to establish a second payment functionality site 315 account.

Even though Biller 1 and Biller 2 leverage the same payment functionality site 315 the consumer 301 will not be able to take advantage of this effectively if he is accessing the payment functionality site 315 through Biller 1's and Biller 2's biller-direct Web sites. He will most likely end up unnecessarily establishing separate payment functionality site 315 accounts for use with each biller. Siloing thus effectively extends from bill presentment through bill payment, as described above, even though the same payment functionality site 315 account could be used across sites. This has undesirable consequences, including the consumer 301 repeatedly providing the same enrollment information to the payment functionality service provider, the payment service provider maintaining a plurality of accounts associated with the single consumer 301, and the consumer 301 being unable to potentially see payment activity across multiple billers in an integrated fashion at the payment functionality site 315. It should be recognized that the payment functionality web site 315 discussed above could alternatively or additionally be supporting sites other than biller sites. Furthermore, Web site 315 could be a bill presentment functionality site providing bill presentment services on behalf of multiple billers. Further, the functionality provided by web site 315 could include both payment and billing functionality, in addition to other EBP functionality. All of the undesirable consequences, whether alone or in combination, do not lend themselves to the goal of greater adoption of EBP services.

Accordingly, a need exists for a technique of accessing EBP services in which a consumer can utilize a single account across multiple branded sites.

OBJECTS OF THE INVENTION

It is an object of the present invention to increase the number of electronic commerce participants.

Another an object of the present invention is to increase the number of electronic commerce transactions.

It is another object of the present invention to increase consumer ease of use of electronic commerce systems.

Still another object of the present invention is to increase consumer ease of use of on-line systems.

Yet another object of the present invention is to provide a technique to reuse a subscriber account across multiple EBP Web sites.

The above-stated objects, as well as other objects, features, and advantages, of the present invention will become readily apparent from the following detailed description which is to be read in conjunction with the appended drawings.

SUMMARY OF THE INVENTION

In accordance with the present invention, a method and a system are provided for accessing an electronic commerce service. An electronic commerce service could be, but is not limited to, an electronic payment service and/or an electronic bill presentment service. In an electronic payment service a payment is made to an electronic commerce participant on behalf of a subscriber of the service provider. A payment could be a payment of a bill issued by a participant or another payee, could be a gift payment, could be a purchase, or could be any other type of payment. The payment is made by the service provider on behalf of the subscriber. In an electronic bill presentment service a bill of a participant is electronically presented to a subscriber by the service provider. A subscriber, as well as a participant, could be an individual, a business, or an organization. A participant is an entity on whose behalf the service provider provides one or more electronic commerce services, and could be, but is not limited to, a sponsor, an electronic biller, a managed payee, or a retailer.

A system of the present invention includes one or more memories, and one or more processors. Each memory stores at least information associated with an enrolled subscriber's account with the service provider. An account is created during a subscriber enrollment with the service provider. An enrolled subscriber is authorized by the service provider to avail himself or herself of one or more of the electronic commerce services offered by the service provider via his or her account. A memory can be, as desired, any medium and/or device for storing information. A processor can be any type of processor capable of functioning to provide access to an electronic commerce service, including, but not limited to, a processor as found in a typical personal computer, mainframe computer, server-type computer, or any other type computing device. Preferably, information processed by a processor is received and/or transmitted via a network. A network can be, but is not limited to, the Internet, a local area network, a wide area network, and the public switched telephone network, as well as any other network capable of carrying information, including a wireless network. Also, a network can be multiple interconnected networks.

The stored account information includes information gathered and/or generated by the service provider during or associated with enrollment associated with a first electronic commerce participant. An enrollment associated with the first electronic commerce participant is an enrollment initiated so that the subscriber can access an electronic commerce service in the context of at least the first participant. Also, the stored information could, but it is not required to, include information gathered and/or generated by the service provider subsequent to enrollment. The stored information includes at least subscriber identifying information which may be utilized in identifying the subscriber, and which can include any of, but is not limited to, a subscriber's name, address, driver's license number, email address, social security number, and funding account identifying information. As desired, other information associated with and/or identifying the subscriber can also be stored. Funding account information is information that identifies an account belonging to the subscriber. A funding account could be, but is not limited to, a demand deposit account, a stored value account, or a credit account.

The stored information also includes subscriber credentials to access the electronic commerce services offered by the service provider. The stored subscriber credentials can be subscriber-first participant specific credentials, which are credentials that are usable to access the offered electronic commerce services from a context of only the first participant. These credentials could be generated by either the first participant or the service provider. Or, the stored subscriber credentials can be subscriber-service provider credentials, which are credentials that are usable by the subscriber to access the offered electronic commerce services from potentially any context. These credentials are generated at the service provider, preferably with subscriber participation.

At some point in time subsequent to the enrollment, a request to access a second electronic commerce service, which could be the same as the first electronic commerce service, offered by the service provider is received. This request is received via an interface, which could be a computer interface or a telephone interface, that is associated with a second electronic commerce participant different than the first participant. That is, this interface identifies at least the second participant. Preferably, though not required, the interface is presented responsive to information received from the second participant, such as a hand-off of a subscriber's Web session from the second participant to the service provider. A determination that subscriber credentials known to the service provider are not included in the received request is made. The request could lack any subscriber credentials, or the request could include credentials that are not known to the service provider, i.e., not stored.

Responsive to the determination that known subscriber credentials are not included in the request, an alternate authentication query is transmitted to the subscriber. The query includes at least a request for two types of information by which the service provider might know the subscriber. That is, the query requests that the subscriber, at his or discretion, choose one of two authentication options. One is for the subscriber to supply subscriber-service provider credentials. It should be noted that it is not required that the request for subscriber-service provider credentials, or the query itself, identify the service provider to the subscriber. That is, the subscriber need not be informed that the service provider is the entity providing the electronic commerce services. Another option is for the subscriber to supply information that identifies the subscriber. This requested subscriber identifying information could be any type of information associated with the subscriber by which the subscriber might be identified. The requested information is information stored by the service provider.

In response to the query, the subscriber provides the requested subscriber identifying information. That is, the subscriber chooses not to supply credentials. This may be because the subscriber is not associated with credentials known to the subscriber, or may be because the subscriber does not realize that he or she possesses credentials that may be supplied responsive to the query. The received subscriber identifying information is then matched to the stored subscriber identifying information. That is, the supplied information is identical to at least a portion of the stored information. The matching results in an identification of the subscriber's account with the service provider. Because of the matching of the received information to the account, the subscriber is granted access to the second electronic commerce service in the context of the account already established.

As can be seen, a subscriber can advantageously access an electronic commerce service involving one electronic commerce participant utilizing an account established in association with an enrollment that involves another, different, electronic commerce participant. Further, this access is granted without the subscriber supplying credentials for accessing the electronic commerce services offered by the service provider.

According to another aspect of the present invention, the request is a first request. Before the first request is received, a second request is received. This second request is a request to access the first electronic commerce service and is received via an interface that is associated with the first electronic commerce participant. After receipt of the second request (which is received prior to the first request) a determination is made that the subscriber is not enrolled. That is, the subscriber is not yet authorized to utilize any electronic commerce service offered by the service provider. At this point, enrollment processing takes place in order to allow the subscriber to have access to at least the first electronic commerce service. The subscriber identifying information that is stored is information that is gathered and/or generated during the enrollment.

According to a further aspect of the present invention, a determination that subscriber credentials known to the service provider are not included in the received second request. Similar to the discussion above, the second request might entirely lack subscriber credentials, or might includes credentials that are unknown to the service provider. Because the second request lacks known credentials, a second alternate authentication query, as described above, is transmitted to the subscriber.

In response to the second query, the subscriber provides the requested subscriber identifying information, not subscriber credentials. A determination is then made that the provided subscriber identifying information is not included in the stored information. That is, the provided information does not match any stored information. The enrollment then takes place in response to this determination. Advantageously, the stored subscriber identifying information is the subscriber identifying information received in response to the second query.

In yet another aspect of the present invention, the stored subscriber credentials are first subscriber credentials. The received request to access the second electronic commerce service is a first request and includes second subscriber credentials. The second subscriber credentials are unknown to the service provider, i.e., not stored. Also, the second subscriber credentials are subscriber-second participant specific credentials.

The received second subscriber credentials are stored in association with the account after the received subscriber identifying information is matched to the stored information. Thus, the stored information associated with the account includes at least two sets of subscriber credentials. After the second subscriber credentials have been stored, a second request to access the second electronic commerce service is received. The second request includes the second subscriber credentials.

The account is again identified, this time based upon the second subscriber credentials included in the received second request and without transmitting an alternate authentication query to the subscriber. After the account is identified, the subscriber is granted access to the second electronic commerce service.

According to still another aspect of the invention, the stored subscriber credentials are transmitted to the subscriber in response to the matching. That is, the subscriber is provided the stored credentials, if the matching has taken place, so that the subscriber can utilize them to access at least one electronic commerce service of the service provider.

In another aspect of the present invention, the stored subscriber credentials are first subscriber credentials. Second subscriber credentials for the subscriber to access at least the second electronic commerce service are generated, preferably with input from the subscriber. The generated second subscriber credentials are subscriber-service provider credentials, introduced above. The generated second subscriber credentials are stored in association with the account.

According to a beneficial aspect of the present invention, the matched subscriber identifying information, i.e., the stored and the received subscriber identifying information, includes at least one of two types of information. The first type is information that identifies a funding account associated with the subscriber. Funding account information includes at least an account number, and as desired, other funding account information such as a routing number of a financial institution at which the funding account is maintained. The second type of information is an email address of the subscriber.

In still another aspect of the present invention, the service provider generates the stored subscriber credentials and transmits the same to the first participant. Thus, the first participant is supplied with the subscriber credentials, which advantageously can be supplied by the first participant to the service provider to grant the subscriber access to the account, and thus one or more electronic commerce services offered by the service provider.

According to yet another aspect of the present invention, a transaction history interface is transmitted to the subscriber. This interface includes information associated with multiple electronic commerce transactions in which the subscriber was involved. Especially beneficially, the transaction history interface includes information associated with a transaction that involves the subscriber and one participant, and with another transaction that involves the subscriber and another participant.

In still another aspect of the present invention, the interface associated with the second electronic commerce participant does not identify the service provider. Thus, the subscriber is able to access the first electronic commerce service without necessarily being aware that the service provider is providing the service.

Also in accordance with the present invention, a database storing information associated with a single subscriber account with an electronic commerce service provider is provided. The database includes enrollment information associated with a subscriber, such as, but not limited to, a subscriber's name, address, telephone number, social security number, drivers license number, email address, and funding account information. The database also includes first subscriber credentials, stored in association with the enrollment information, for utilizing the account. That is, the first subscriber credentials allow the subscriber to access at least one service offered by the service provider. These first credentials are associated with a first electronic commerce participant and identify the subscriber to the service provider. Also stored are second subscriber credentials for utilizing the account. The second credentials are also stored in association with the enrollment information and are associated with a second electronic commerce participant and identify the subscriber to the service provider. The first and the second participants are different entities.

In a further aspect, the database also stores third subscriber credentials for accessing the account. These third credentials are stored in association with the enrollment information and identify the subscriber to the service provider. However, the third subscriber credentials are not associated with any electronic commerce participant.

It will also be understood by those skilled in the art that the invention is easily implemented using computer software. More particularly, software can be easily programmed, using routine programming skill, based upon the description of the invention set forth herein and stored on a storage medium which is readable by a computer processor to cause the processor to operate such that the computer performs in the manner described above.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 13 is an exemplary screen shot presented to a subscriber by the Universal Payments functionality in accordance with certain aspects of the present invention.

DESCRIPTION OF PREFERRED EMBODIMENT(S)

Figure 4:
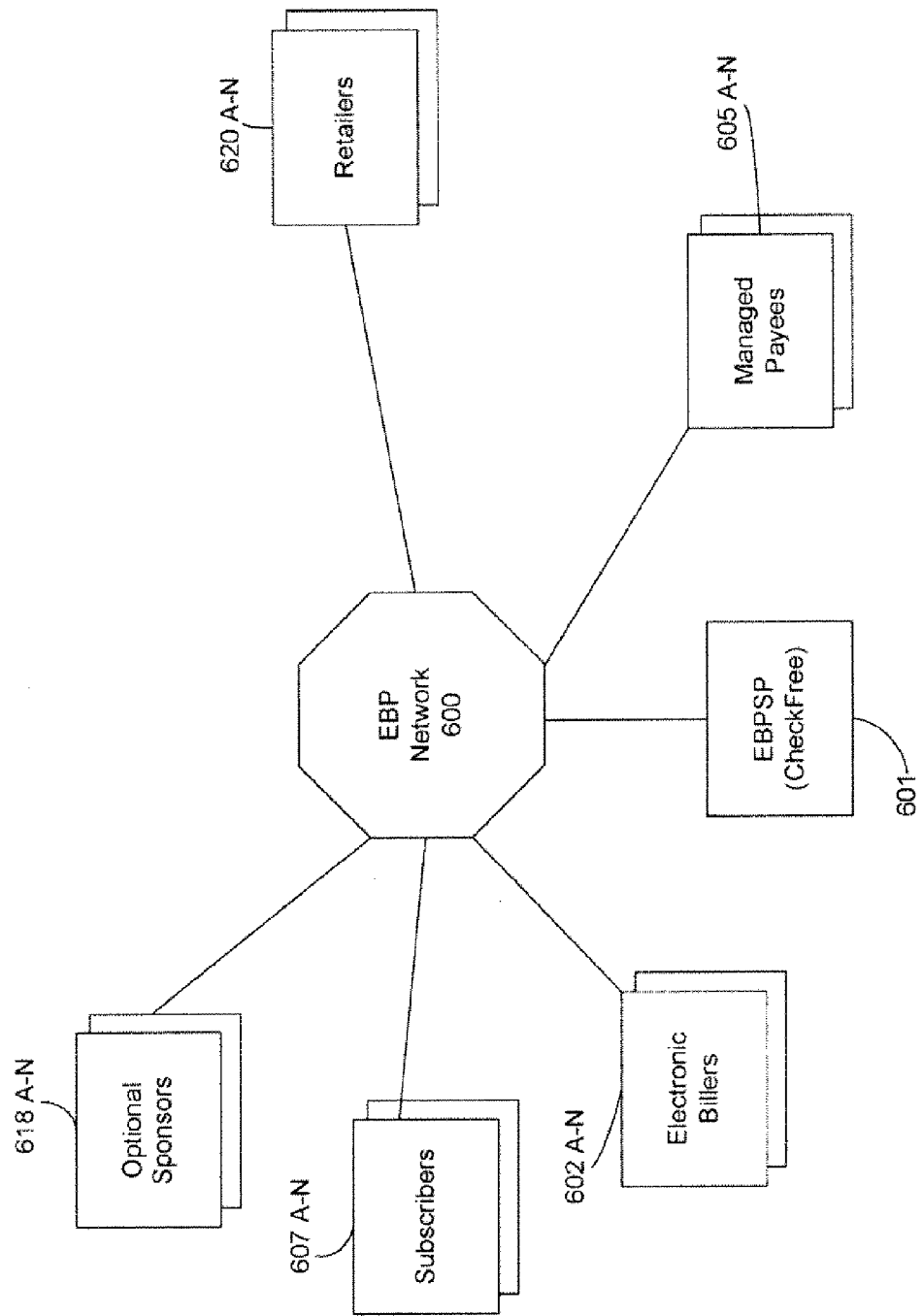
FIG. 4 is a simplified depiction of an electronic billing and payment network of the present invention, including an electronic billing and payment service provider (EBPSP), one or more subscribers of the service, one or more electronic billers, one or more managed payees, one or more retailers, and one or more optional sponsors.

FIG. 4 is a network diagram that shows a number of network entities participating in an electronic billing and payment (EBP) network 600 in accordance with the present invention. Communications between entities participating in the EBP network 600 can travel via the Internet, via one or more other networks, or via both the Internet and one or more other networks.

As shown, the network 600 includes a central electronic billing and payment service provider (EBPSP) 601, such as CheckFree, or some other electronic billing and/or payment service provider. The EBPSP 601 provides electronic payment functionality, sometimes referred to as e-payments, and provides electronic billing functionality, commonly referred to as e-billing. The EBPSP 601 perhaps additionally provides other electronic commerce services.

The network 600 also includes one or more electronic billers 602A-N that can bill their customers electronically, by presenting e-bills to customers, either directly or through the EBPSP 601. Electronic billers are sometimes referred to as e-billers. Also present are one or more managed payees 605A-N. Managed payees are not synonymous with electronic billers. Rather, for purposes of the description set-forth herein, these are entities for which the EBPSP 601 provides on-line payment functionality, which facilitates e-payments to managed payees.

Figure 6:
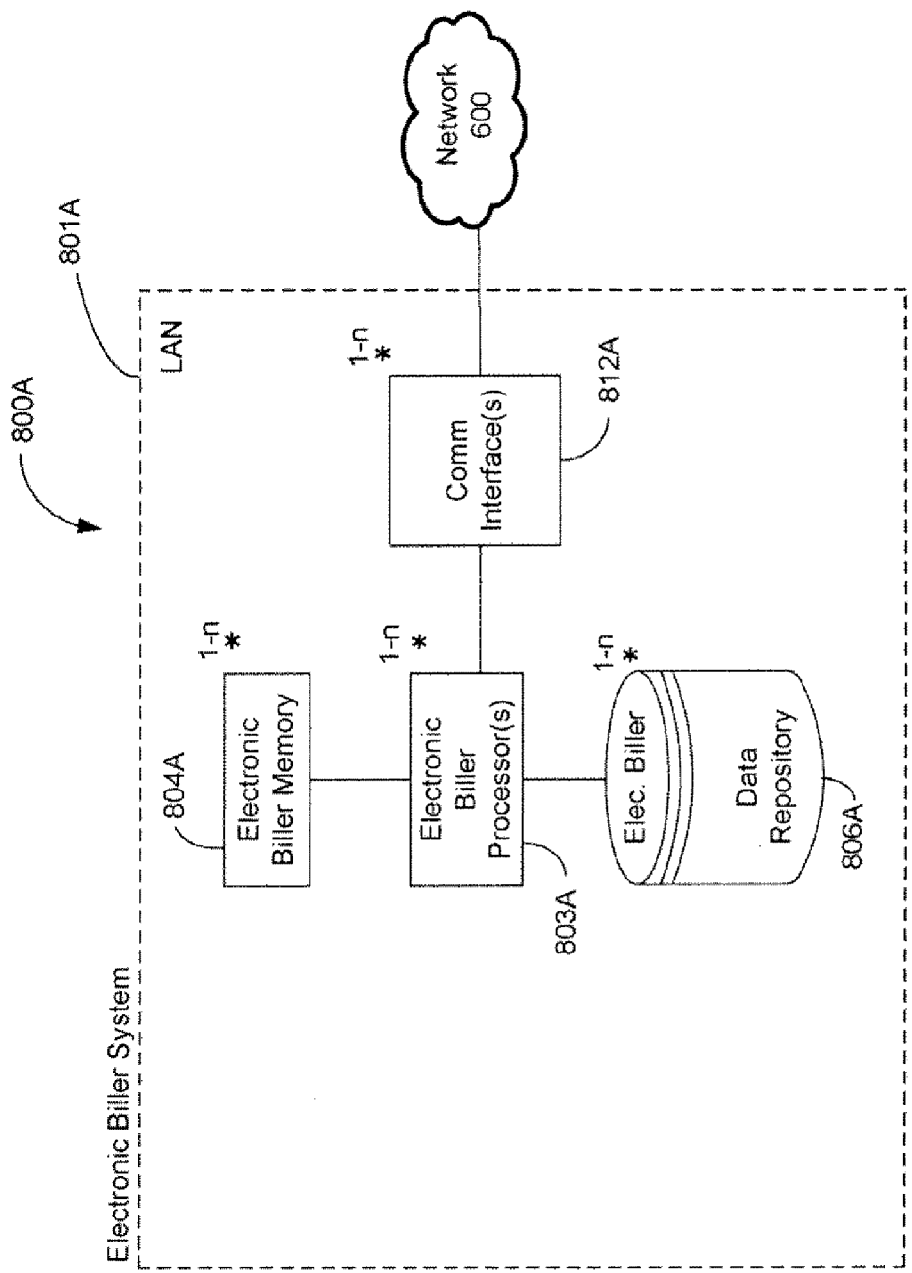
FIG. 6 is a simplified depiction of a computing system which can be associated with any electronic biller of FIG. 4 in accordance with the present invention.

The EBPSP 601 provides EBP services to a number of consumers, referred to in FIG. 6 as subscribers 607A-N. A subscriber could be an individual, a business, or another organization that receives e-bills, makes e-payments, and/or participates in other electronic commerce services provided by the EBPSP 601.

Also shown are sponsors 618A-N, such as banks, portals and other entities which sponsor subscribers and, optionally provide one or more of the subscribers 607A-N access to the EBPSP 601. Sponsors are sometimes referred to as consumer service providers (CSPs). The sponsors 618A-N may provide services to subscribers utilizing their own or licensed software, and rely on the EBPSP for certain processing, or the EBPSP may provide the sponsor branded services.

Finally, retailers 620A-N are depicted. Retailers 620A-N offer goods or services for sale via the Internet or other networks, and/or at brick-and-mortar, e.g., storefront, locations. The EBPSP 601 may provide e-payments to and/or provide other electronic commerce services for those retailers. It will be appreciated that other entities (not shown) could, if desired, participate in the EBP network 600, either as receiving services from the EBPSP 601, or aiding and/or supporting the EBPSP 601 in providing services.

Figure 5:
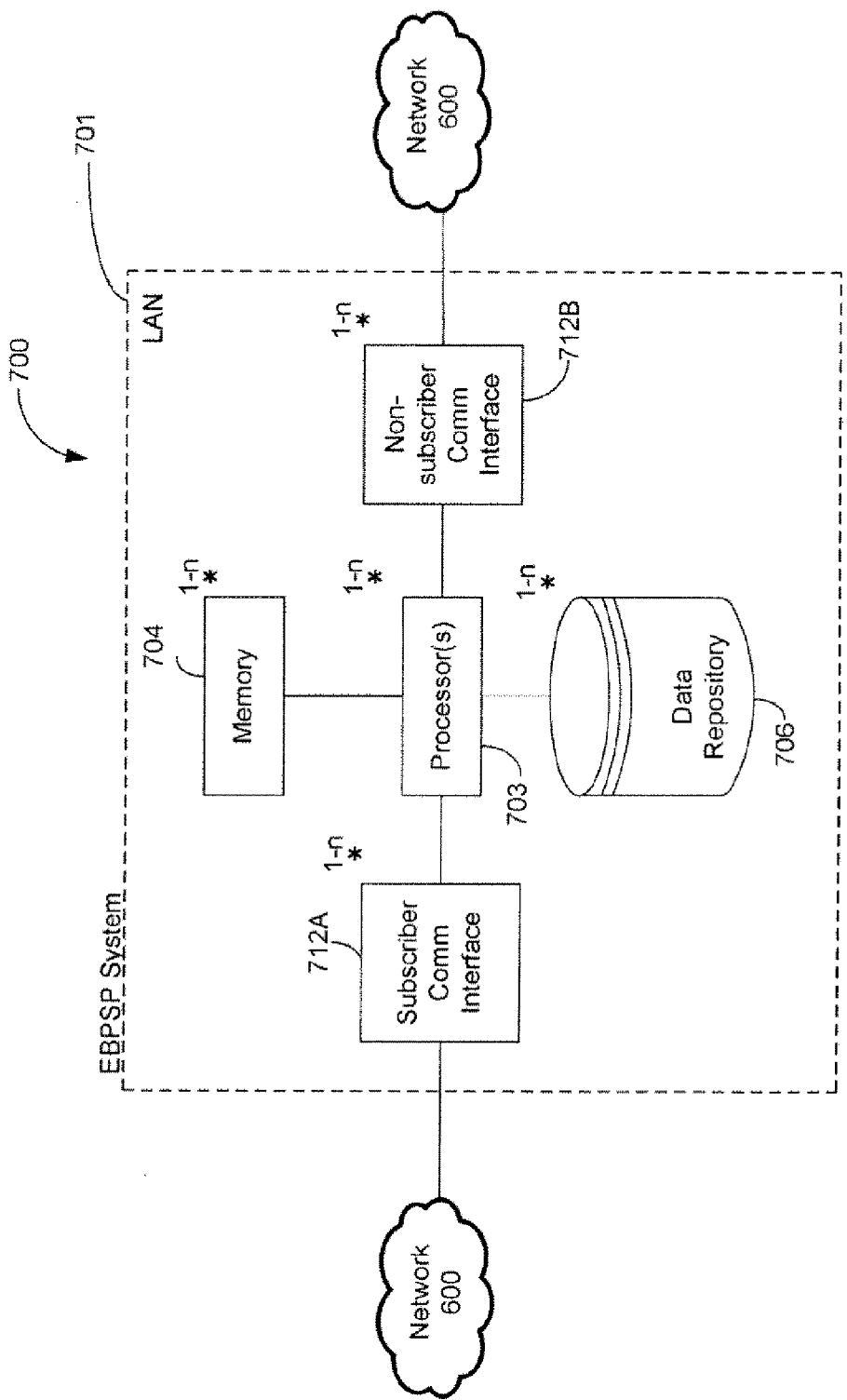
FIG. 5 is a simplified depiction of a computing system which can be associated with the electronic billing and payment service provider of FIG. 4.

FIG. 5 is a diagram of an exemplary system 700 representing the EBPSP 601 on the network 600. As shown, an EBPSP local area network 701 (LAN), indicated with dashed lines, includes one or more EBPSP processors 703, each of which may be associated with one or more EBPSP memories 704 configured to hold software executable by the EBPSP processor(s) 703 and data, both in a transient fashion. The EBPSP processor(s) 703 communicate with one or more EBPSP data repositories 706 of persistently stored software and data associated with the services provided by the EBPSP 601, at least one communications interface 712A for transmitting information to and/or receiving information from subscribers 607A-N via the network 600, and at least one communications interface 712B for transmitting information to and/or receiving information from, via the network 600, non-subscriber entities shown in FIG. 4. Communications interfaces are also referred to as communications ports. The EBPSP processor(s) 703 cause the EBPSP communications interfaces 712A and 712B to transmit information onto the network 600. The transmitted and received information includes information associated with EBP, and perhaps other, services provided by the EBPSP 601.

Communications with the subscribers 607A-N or non-subscriber entities could be via e-mail, a Web interface, or other type interface. These communications with subscribers 607A-N and non-subscriber entities could be synchronous or asynchronous. Examples of asynchronous communications include batch file or message queuing communications. Synchronous communications may encompass any of a variety of request-response protocols, with Web services being a particular instance.

FIG. 6 is a diagram of an exemplary system 800A representing an electronic biller 602A-N on the network 600. As shown, the hardware of system 800A is similar to that of the EBPSP system 700. System 800A includes an electronic biller LAN 801A, indicated with dashed lines, one or more electronic biller processors 803A, each of which may be associated with one or more electronic biller memories 804A configured to hold software executable by electronic biller processor(s) 803A and data, both in a transient fashion. The electronic biller processor(s) 803A communicate with one or more electronic biller data repositories 806A used to persistently store software and optionally data, as well as multiple electronic biller communications interfaces 812A for communicating with both subscribers and non-subscriber entities of FIG. 4.

Figure 7:
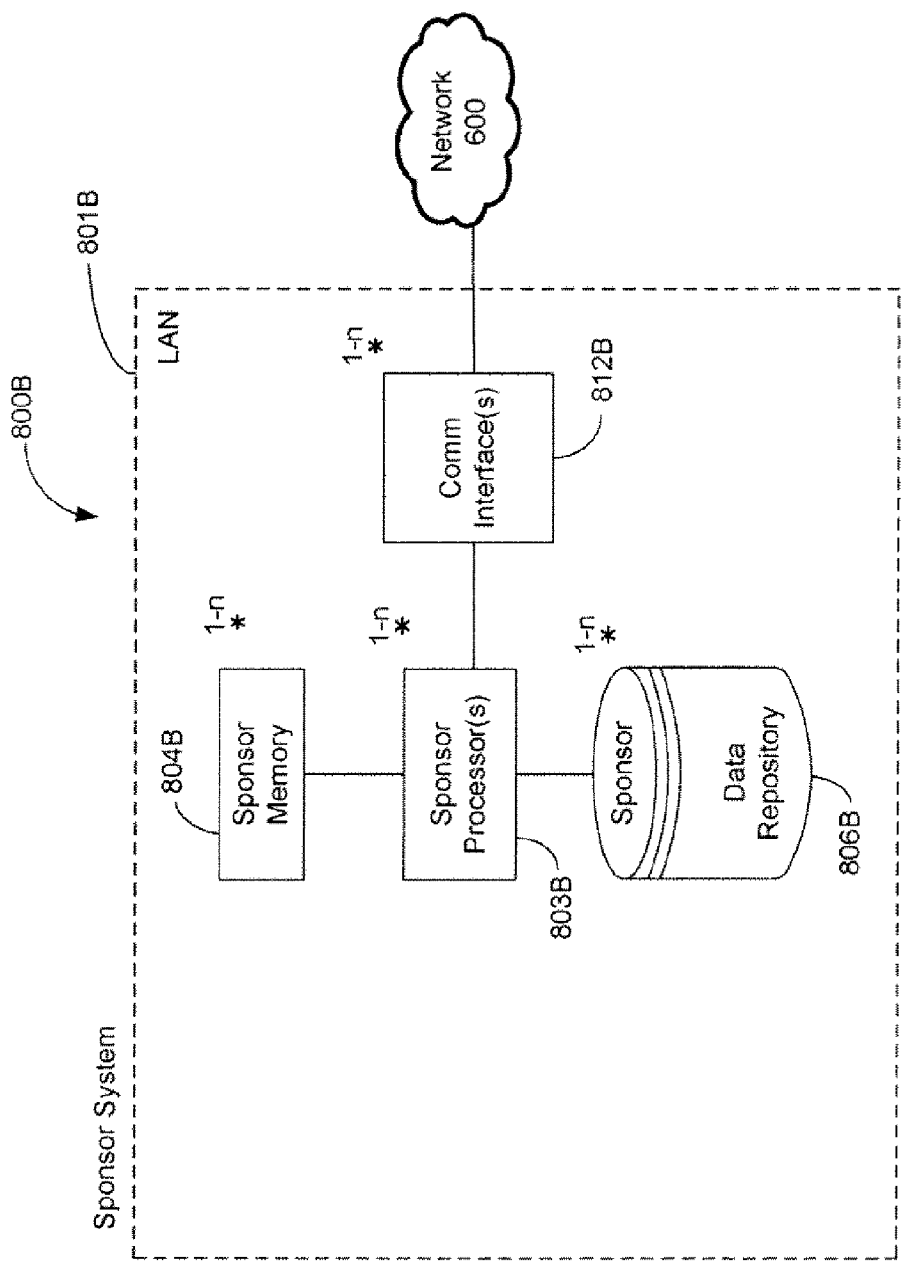
FIG. 7 is a simplified depiction of a computing system which can be associated with any sponsor of FIG. 4 in accordance with the present invention.

FIG. 7 is a diagram of an exemplary system 800B representing a sponsor 618A-N on the network 600. System 800B includes a sponsor LAN 801B, indicated with dashed lines, one or more sponsor processors 803B, each of which may be associated with one or more sponsor memories 804B configured to hold software executable by sponsor processor(s) 803B and data, both in a transient fashion. The sponsor processor(s) 803B communicate with one or more sponsor data repositories 806B used to persistently store software and optionally data, and multiple sponsor communications interfaces 812B for communicating with both subscribers and non-subscriber entities of FIG. 4.

Figure 8:
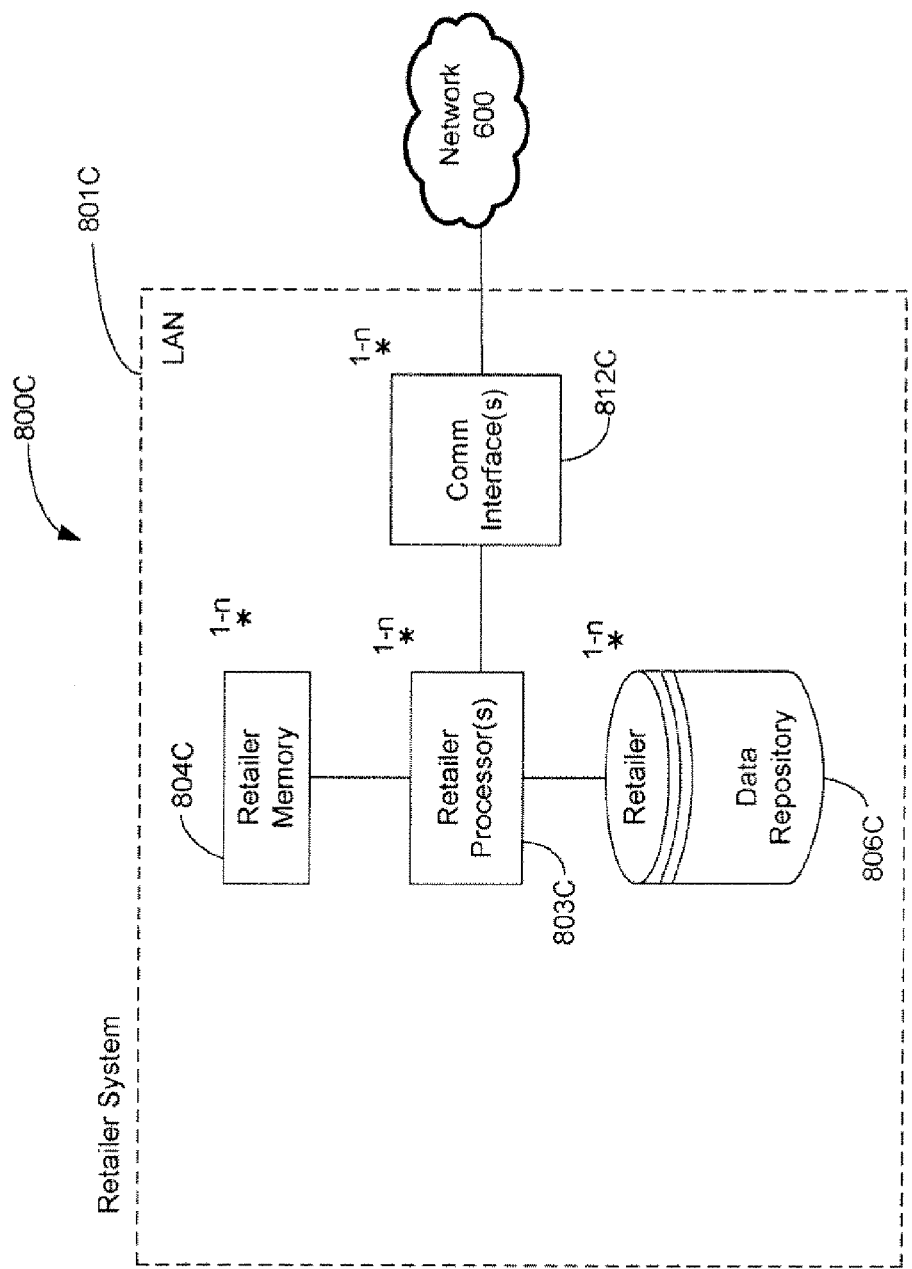
FIG. 8 is a simplified depiction of a computing system which can be associated with any retailer of FIG. 4 in accordance with the present invention.

FIG. 8 is a diagram of an exemplary system 800C representing a retailer 620A-N on the network 600. System 800C includes a retailer LAN 801C, indicated with dashed lines, one or more retailer processors 803C, each of which may be associated with one or more retailer memories 804C configured to hold software executable by retailer processor(s) 803C and data, both in a transient fashion. The retailer processor(s) 803C communicate with one or more retailer data repositories 806C used to persistently store software and optionally data, and multiple retailer communications interfaces 812C for communicating with both subscribers and non-subscriber entities of FIG. 4.

Figure 9:
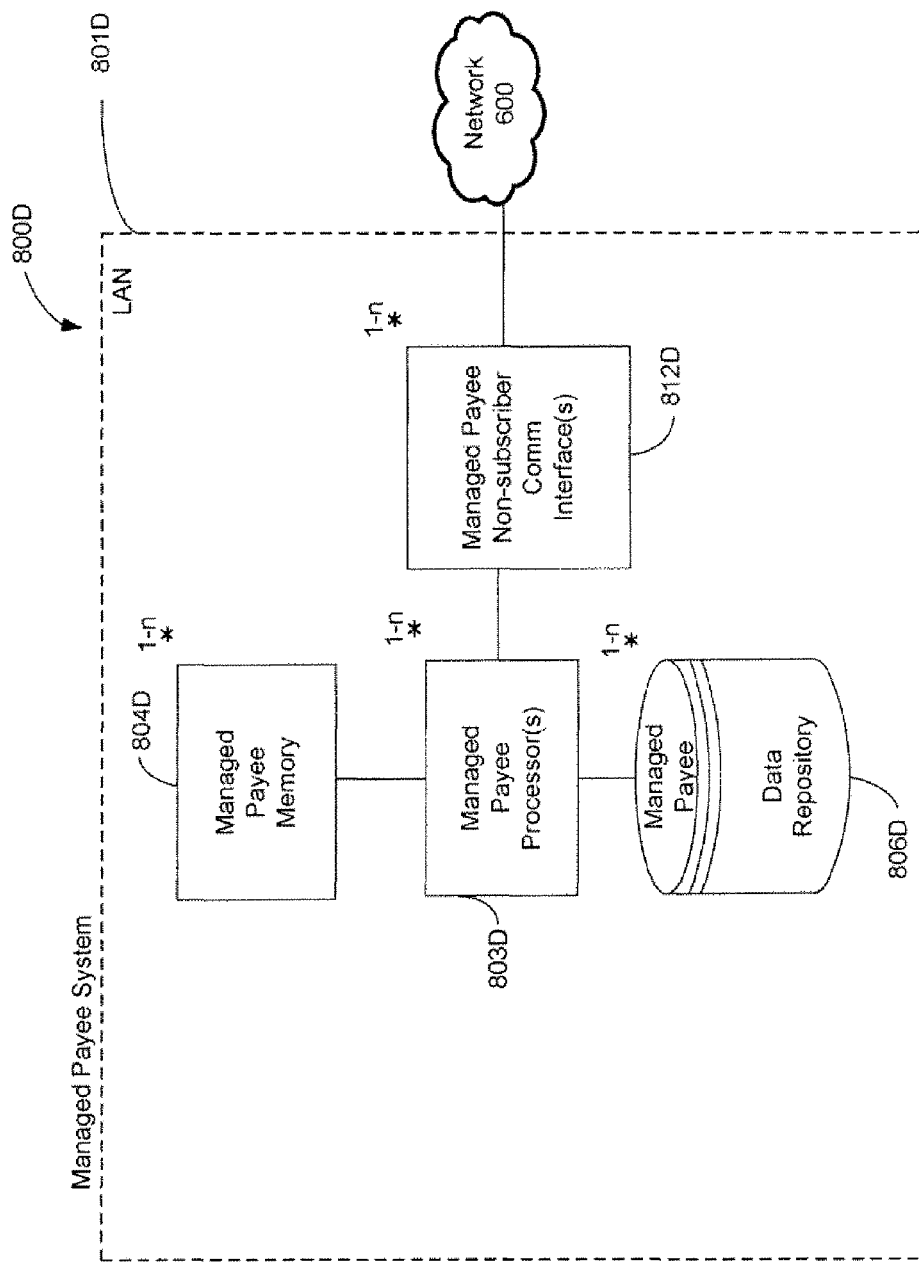
FIG. 9 is a simplified depiction of a computing system which can be associated with any managed payee of FIG. 4 in accordance with the present invention.

FIG. 9 is a diagram of an exemplary system 800D representing a managed payee 605A-N on the network 600. As shown, a LAN 801D, indicated with dashed lines, includes one or more managed payee processors 803D, each of which may be associated with one or more managed payee memories 804D configured to hold software executable by managed payee processor(s) 803D and data, both in a transient fashion. The managed payee processor(s) 803D are also associated with one or more managed payee data repositories 806D of persistently stored software and optionally data. Also shown is one or more managed payee communications interfaces 812D for communicating with non-subscriber entities of FIG. 6. It will be noted that the managed payee system of FIG. 9 lacks a communications interface for interaction with a subscriber.

Figure 10:
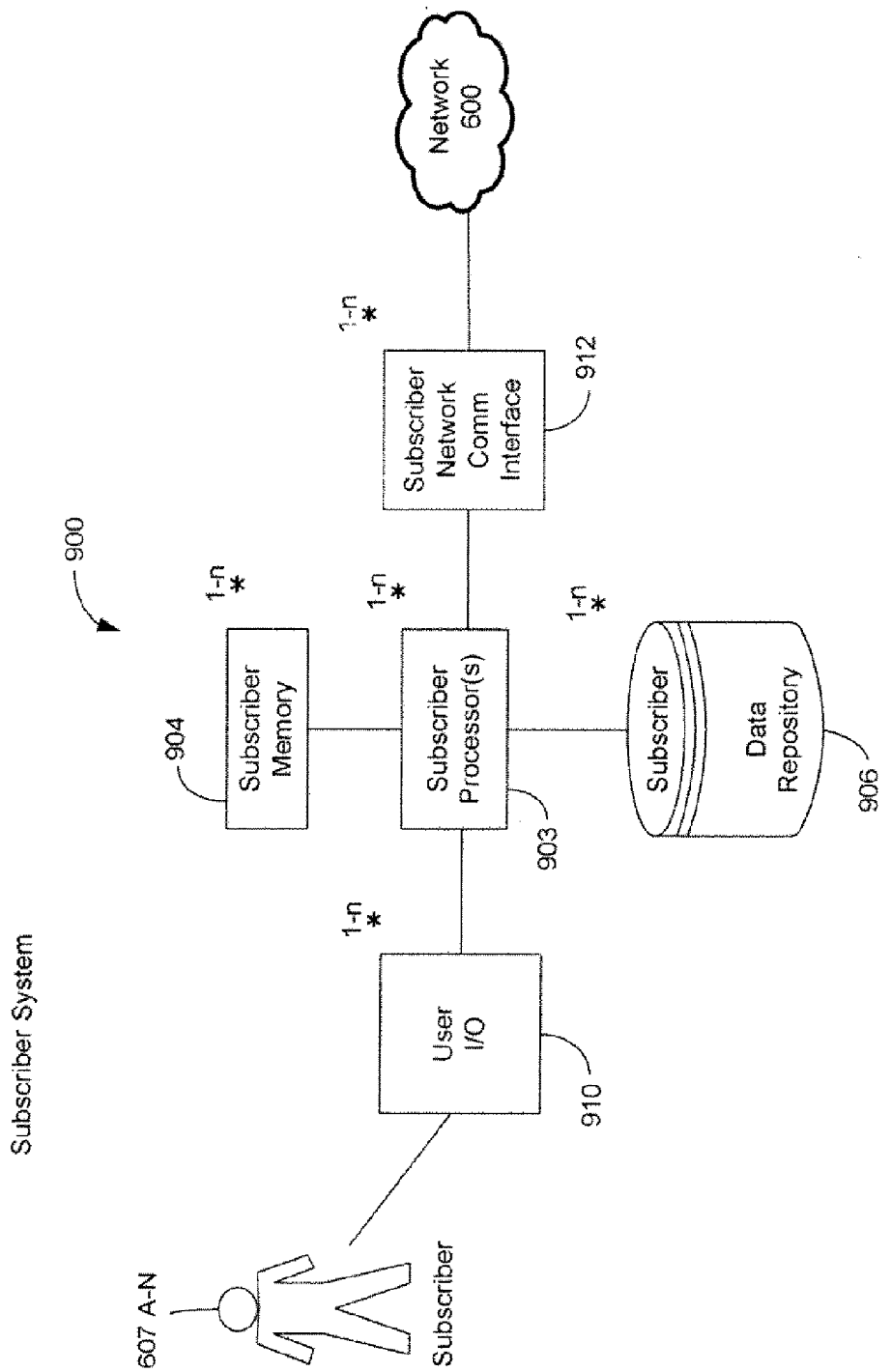
FIG. 10 is a simplified depiction of a computing system which can be associated with any subscriber of FIG. 4 in accordance with the present invention.

FIG. 10 is a diagram of an exemplary system 900 representing a subscriber 607A-N on the network 600. A subscriber 607A-N utilizes system 900 to access EBPSP 601 services via network 600. The subscriber system 900 includes one or more subscriber processors 903, each of which may be associated with one or more subscriber memories 904 configured to hold software executable by subscriber processor(s) 903 and data, both in a transient fashion The subscriber processor(s) 903 may be associated with one or more subscriber data repositories 906 of persistently stored software and optionally data. A subscriber network communications interface 912 is also included in subscriber system 900 for communications via network 600, and perhaps other networks. A subscriber 607A-N interacts with the subscriber processor(s) 903 through user input/output mechanisms (user I/O) 910. A user input/output mechanism can include a monitor, a keyboard, a mouse, a speaker, a microphone, and/or other types of input/output mechanisms.

Figure 1A:
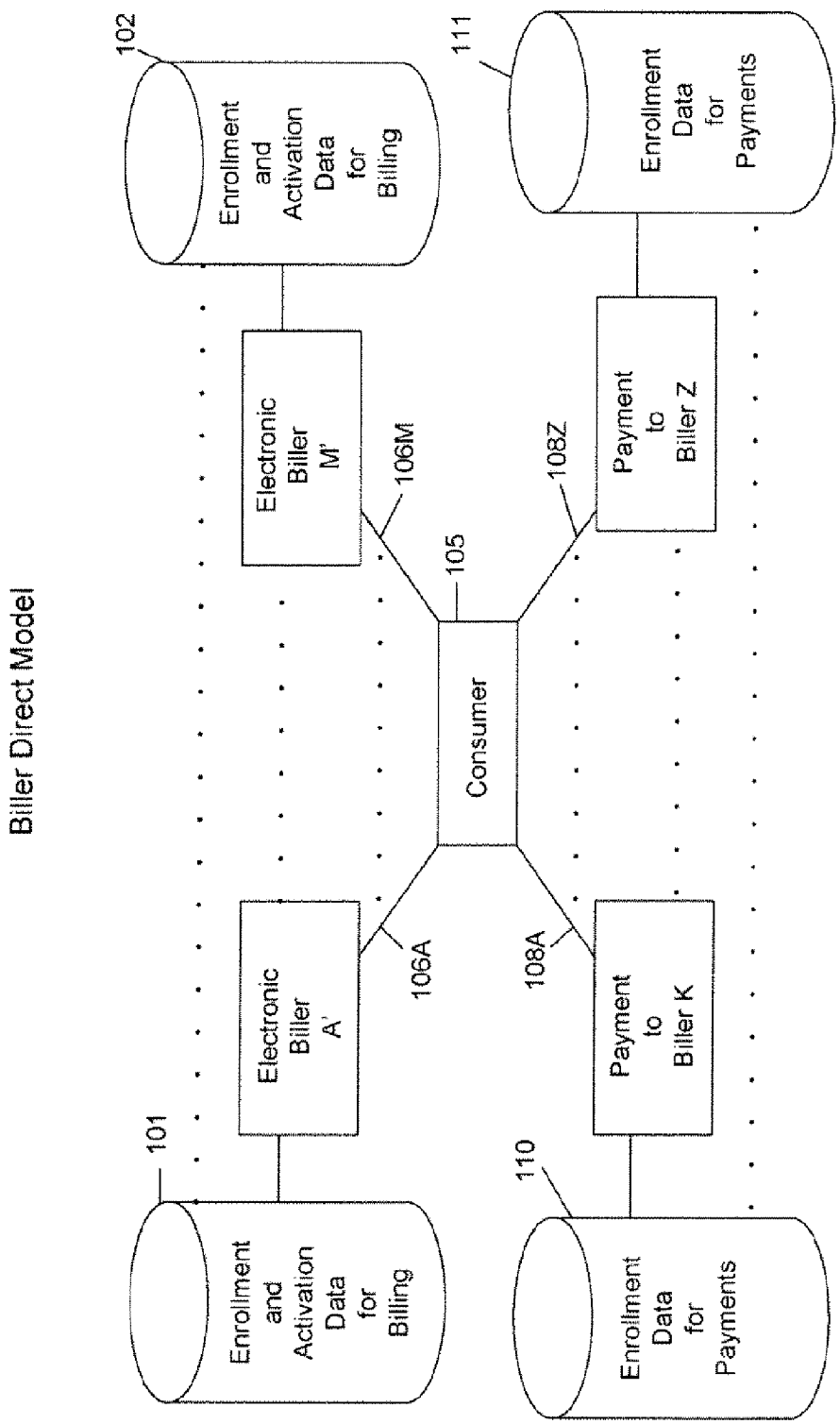
FIG. 1A depicts a prior art biller direct model of an electronic billing and/or payment system.
Figure 1B:
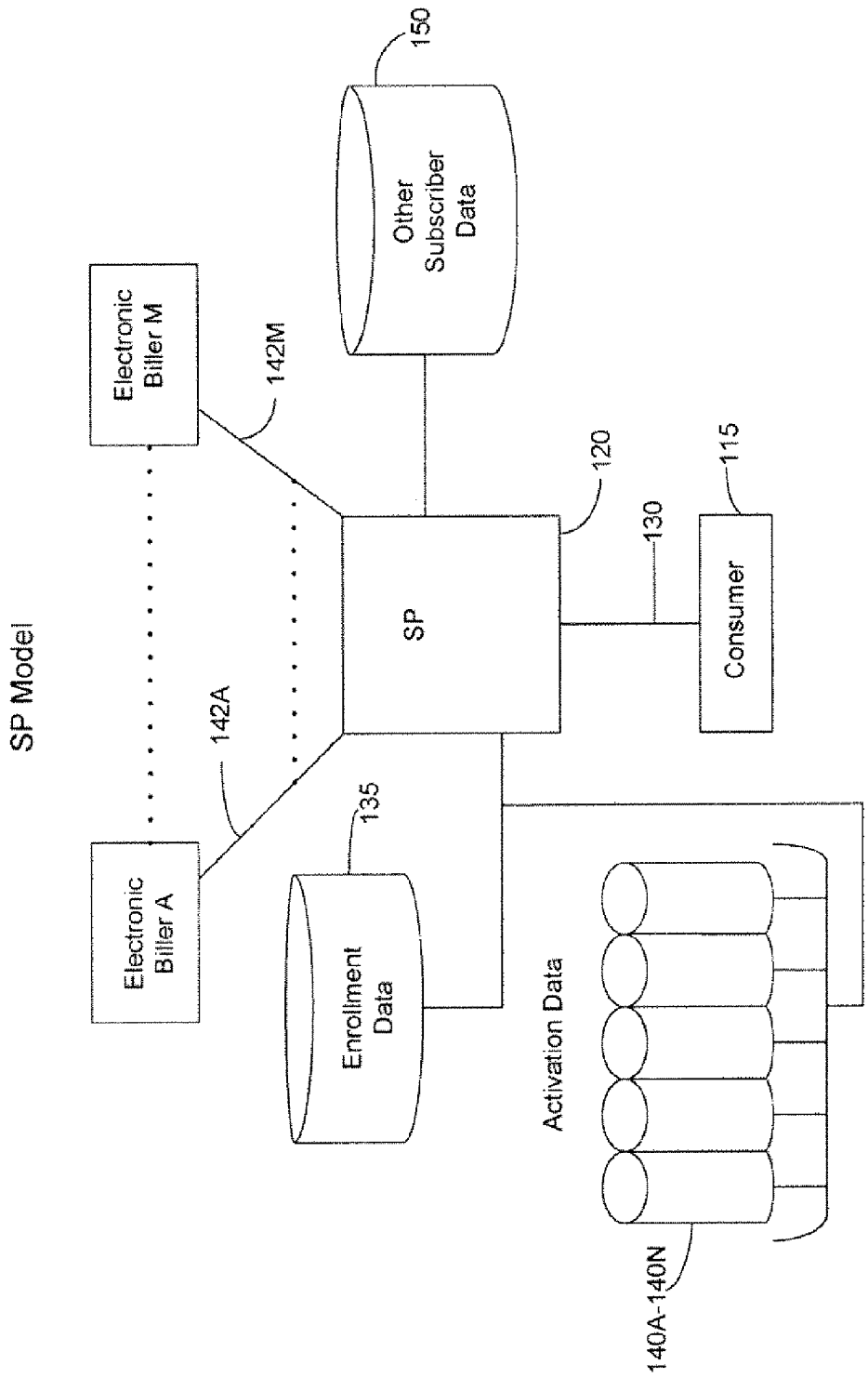
FIG. 1B depicts a prior art service provider model of an electronic billing and/or payment system.
Figure 2:
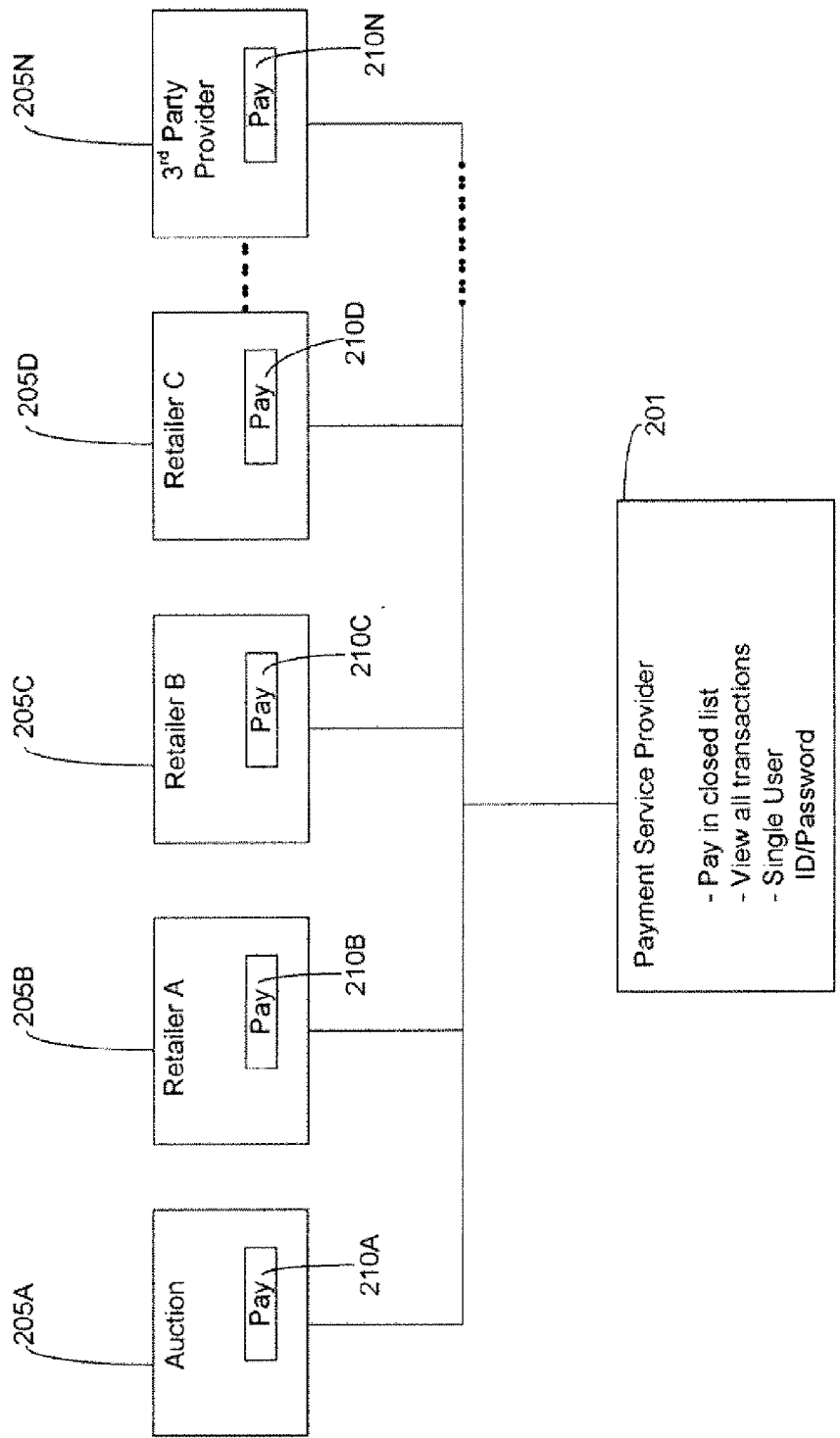
FIG. 2 depicts a prior art payment system accessed from a plurality of unrelated Web sites.
Figure 3:
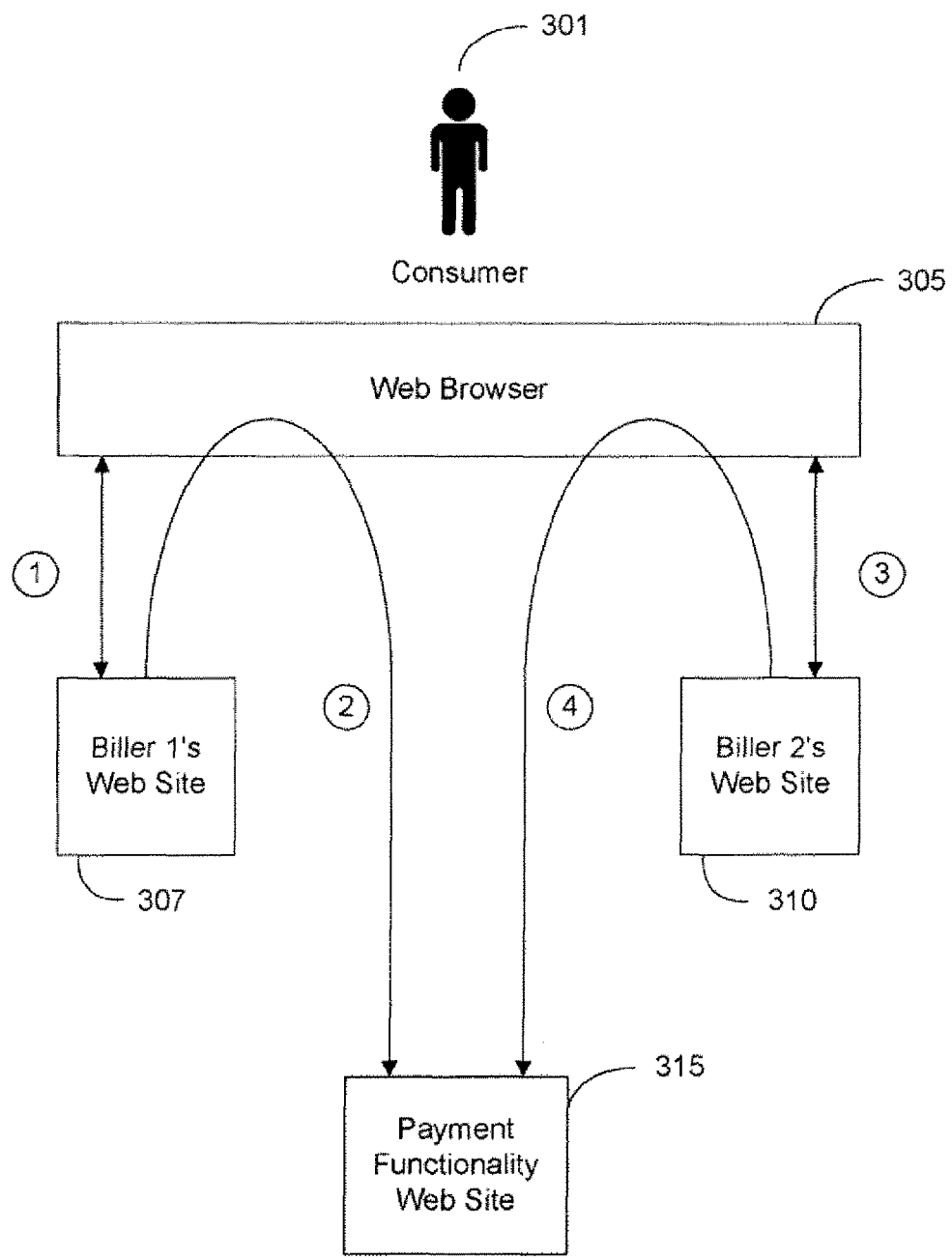
FIG. 3 depicts problems associated with accessing multiple biller-branded Web sites utilizing a single network user ID/password combination.
Figure 11:
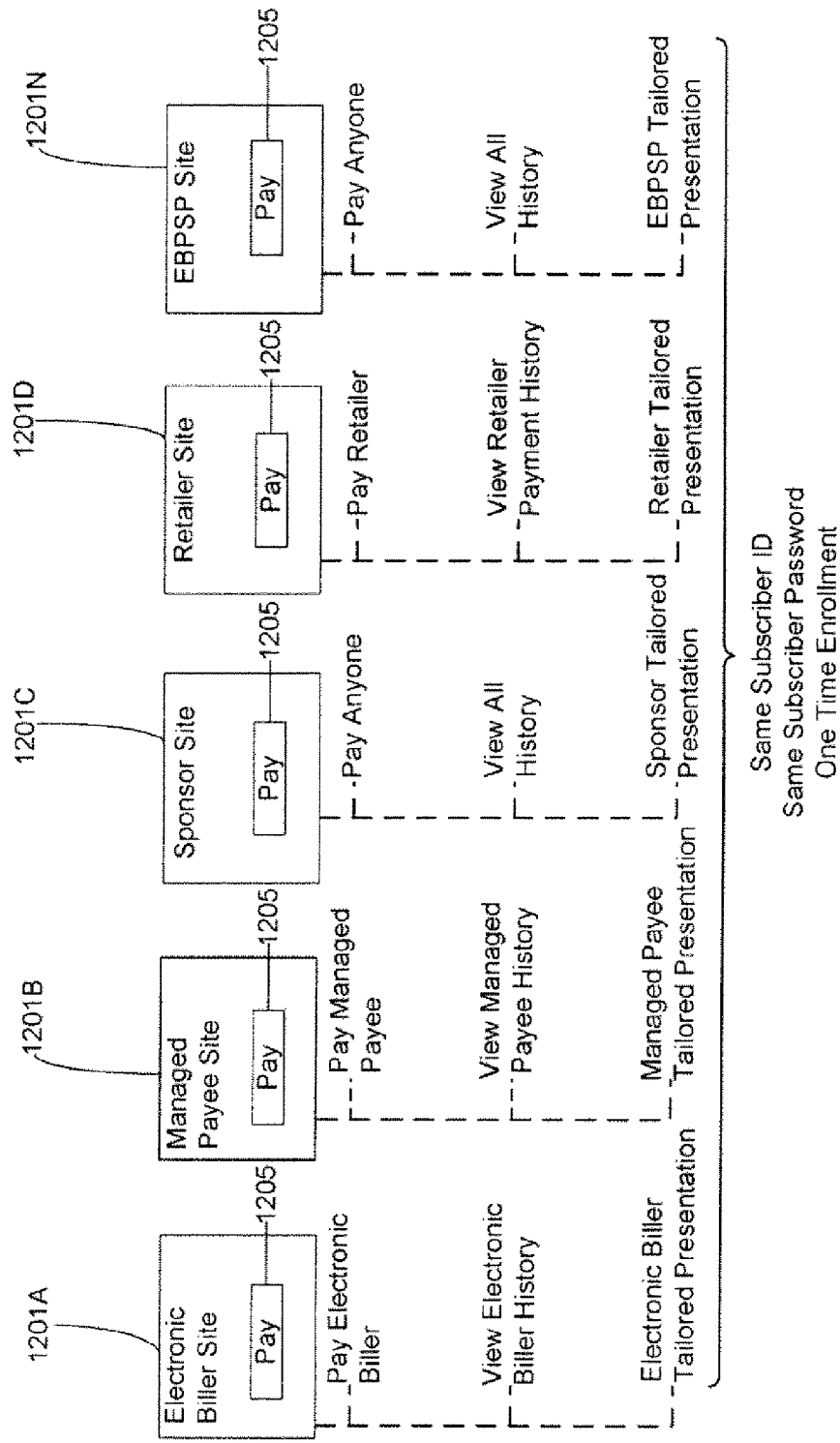
FIG. 11 is a depiction of functionality of Universal Payments functionality in accordance with certain aspects of the present invention.

FIG. 11 depicts an aspect of the present invention which enables a subscriber 607A-N to enroll once in a payment service and reuse the payment service account across multiple electronic biller 602A-N, managed payee 605A-N, and/or retailer 620A-N Web sites to make payments and view history while having a tailored payment experience, including any of seamless access of the payment site functionality through consolidated log on, branding of the payment site functionality, or payment site functionality scoped for the originating site, unlike the system shown in FIG. 2 and discussed above. This aspect is known as Universal Payments functionality. Note that while this discussion is in the context of payment functionality provided in association with multiple sites, this, as desired, could equally be applied to EBP functionality that could be provided as a common service.

Shown in FIG. 11 are multiple Web sites 1201A-1201N. Each Web site could be associated with an electronic biller 602A-N, a managed payee 605A-N, a sponsor 618A-N, a retailer 620A-N, or the EBPSP 601 itself. Additionally, any of Web sites 1201A-D could be hosted by the EBPSP 601, or another entity. Also, each of sites 1201A-N are uniquely branded. Common to each of the sites is a payment link 1205. A subscriber 607A-N could activate link 1205 at a retailer branded site and make a payment only to that retailer or view payment history to that retailer. The subscriber could then move to a managed payee branded site and see payment history specific to only that managed payee, as well as make payment to that managed payee upon activation of link 1205. If link 1205 is activated at an electronic biller branded site, the subscriber could view electronic bills from that biller only, make payment to that biller only, and view payment history to that biller only. Thus, transactions are filtered by the EBPSP processor(s) 703 to be relevant only to the network entity at whose site the payment link 1205 has been activated. However, if the subscriber visits an EBPSP branded site or a sponsor branded site in order to view and/or pay bills, they would preferably see all transactions for any payee to which they have made a payment utilizing link 1205 and could make payment to any network entity participating in electronic payments. Alternatively, as desired, one or both of the EBPSP site 1201N and the sponsor site 1201C could offer only a closed (restricted) payee list. In such a case payment history for only payees included in a closed payee list would be available via the Web site with which that list is associated.

Whenever a subscriber 607A-N selects a payment button 1205 via a source user interface (UI), the system hosting the source UI hands off the user session to the EBPSP 601 processor(s) 703 via network 600 if the accessed site (source site) presenting the UI is not EBPSP hosted. The handoff contains at least identification of the source. Additionally, if the source site performs consolidated logon with the EBPSP 601, the handoff may contain, as desired, subscriber identifying access credentials and preferably source authentication. Preferably, the source site sends payment information, including date and amount, at hand-off. Any information from the source site is referred to as source data. The source data is received by communications interface(s) 712B and passed to Universal Payments functionality by the EBPSP processor(s) 703. If the source UI is hosted by the EBPSP system 700, the same information is passed to the Universal Payments functionality by the EBPSP processor(s) 703.

If the source data is received from a non-EBPSP hosted Web site, the Universal Payments functionality preferably validates the source data by accessing stored information. Specifically, if the source UI is not EBPSP 601 hosted, any received source identification, source authentication, and subscriber access credentials are validated, preferably by accessing stored source and/or subscriber information, and payment information is validated for acceptability against appropriate business rules.

Figure 12:
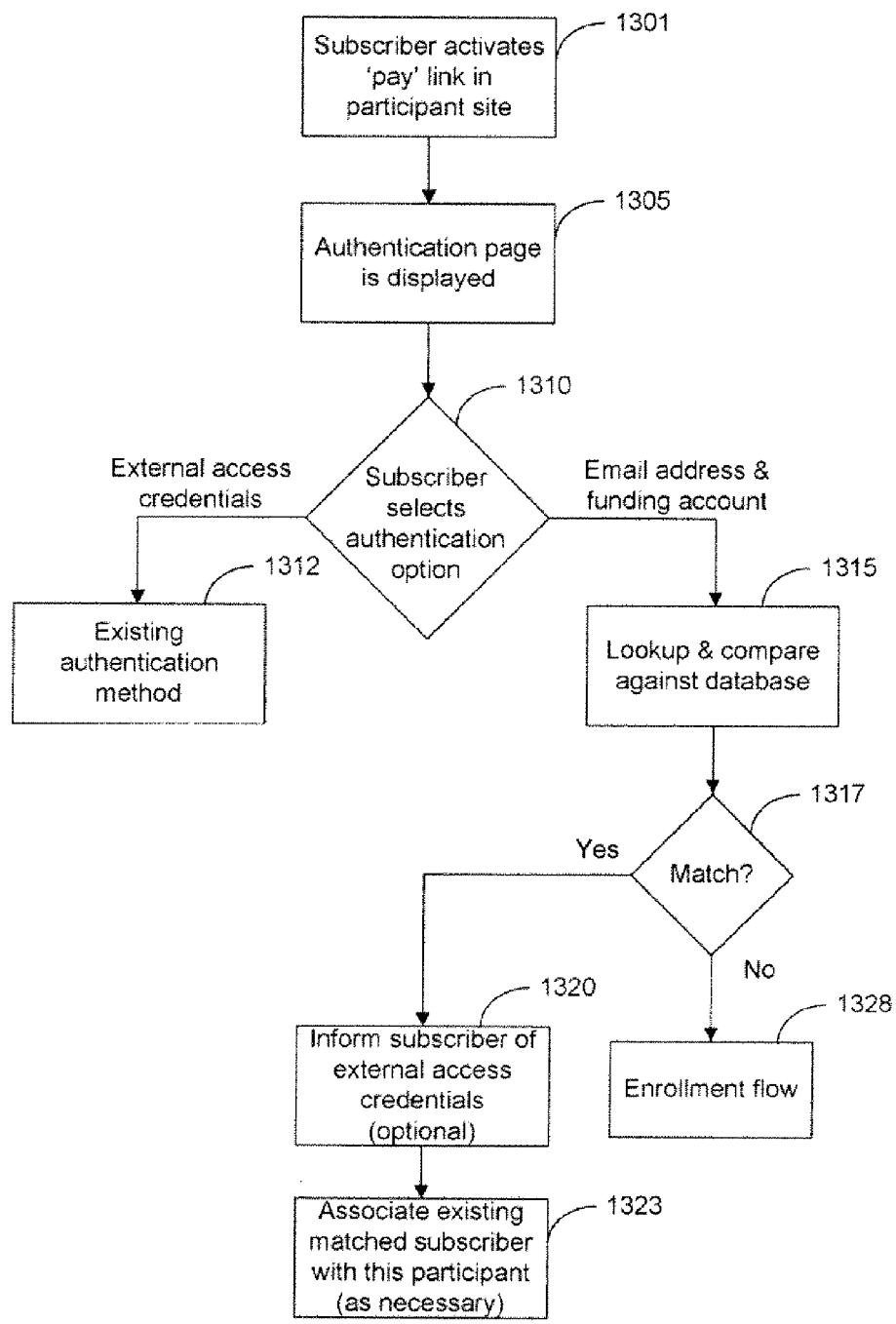
FIG. 12 is a simplified depiction of processing of the Universal Payments functionality in accordance with certain aspects of the present invention.

The Universal Payments functionality causes communications interface(s) 712B to transmit a subscriber payment UI to the subscriber system 900 via the network 600 that is preferably branded specifically for the source UI. If the source UI does not practice consolidated log on, if consolidated log on fails for some reason, or if the hand-off is a first hand-off of this subscriber 607A-N to the EBPSP 601 from a source site practicing consolidated log on, operations as shown in FIG. 12 and described further below are performed.

As will be described in detail below, a subscriber 607A-N is provided with one time enrollment with the EBPSP 601 and can reuse the account at the EBPSP 601 to pay bills presented by different billers at different sites, and make payments to other entities, including retailers, for example, for on-line purchases or auction purchases, while a network entity is provided with control over the branding and user experience in the payment functionality.

Introduced above, a subscriber 607A-N might not recognize that access credentials associated with direct log on are usable across multiple ones of the Web sites of FIG. 11. Also, a subscriber 607A-N might only be associated with an entity (or entities) that participate in consolidated log on, and accordingly might not have access to access credentials for the EBPSP 601. In either situation, a subscriber 607A-N may end up enrolling multiple times with the EBPSP 601.

In order to eliminate the occurrence of multiple enrollment, a subset of subscriber information included in a participant profile database that is stored in a data repository 706 is leveraged by the Universal Payments functionality to recognize that such a subscriber 607A-N is already enrolled. The contents of the participant profile database with be discussed further below.

The present invention utilizes two types of access credentials. The first type of access credentials are internal access credentials, which can also be referred to as subscriber-payee specific credentials. Internal access credentials are associated with consolidated log on. Internal access credentials can be any of, but are not limited to, a subscriber ID, a subscriber ID/password combination, a digital signature, or another cryptographic token. A subscriber's internal access credentials could be assigned, as desired, by a handing-off site, or by the EBPSP 601. If internal access credentials are assigned by the EBPSP 601, the EBPSP 601 provides those assigned credentials back to the handing-off site. Preferably, a subscriber 607A-N will not be informed of any internal access credentials. It should be noted that a subscriber will have unique internal access credentials for each handing-off site that participates in consolidated log on from which that subscriber 607A-N has been handed-off to the EBPSP 601.

The second type of access credentials are external access credentials, which can also be referred to as subscriber-service provider credentials. External access credentials are associated with direct log on. External access credentials are preferably in the form of a subscriber ID/password combination, though other information could be, as desired, utilized. In a preferred embodiment, a subscriber 607A-N establishes his or her own external access credentials, though, as desired, another entity could assign such to the subscriber 607A-N. Also preferably, the EBPSP 601 does not share external access credentials with other network participants, e.g., only the subscriber 607A-N and the EBPSP 601 know the subscriber's external access credentials. It should be stressed that a subscriber will only be associated with one set of external access credentials.

The participant profile database includes subscriber enrollment information for each account, such as, but not limited to, subscriber name, address, phone number(s), e-mail address (es), and funding account information. The subscriber information associated with the account also includes any and all access credentials associated with that account. This will include external access credentials, if the subscriber 607A-N is associated with a handing-off site that practices direct log on, and/or one or more source site-specific internal access credentials, if the subscriber 607A-N is associated with one or more handing-off sites that practice consolidated log on. Thus, each subscriber 607A-N is associated with a single account with the EBPSP 601, that account being reflected in an entry in the participant profile database.

FIG. 12 is a simplified depiction of the operations the Universal Payment functionality to enroll a subscriber 607A-N and to subsequently authenticate that subscriber utilizing subscriber data stored in the participant profile database. Prior to the Universal Payment functionality being invoked, at step 1301 a subscriber 607A-N, via a source site (i.e., one of an electronic biller site such as site 1201A, a managed payee site such as site 1201B, a sponsor site such as sponsor site 1201 C, a retailer site such as site 1201D, or the EBPSP site 1201 N) requests to make an electronic payment by activating a pay link 1205. At this point, a user session is handed off to an EBPSP processor 703 (if the initial site is not hosted by the EBPSP 601). At step 1305 the EBPSP processor 703 causes an authentication page to be presented to the subscriber 607A-607N if the handoff was in the context of a direct log on, or if the handoff was in the context of a consolidated log on and the subscriber 607A-N has not previously been handed-off to the EBPSP 601 from this source site, or if a consolidated log on fails for some other reason.

FIG. 13 is an exemplary depiction of an alternate authentication query page 1300. As shown, this screen 1300 preferably includes payment parameters passed from the initial site to the EBPSP processor 703 at handoff. For example, this payment is to ACME, is in the amount of $139.00, and reflects a payment date that is the bill due date (Jul. 15, 2003). The alternate authentication query page 1300 includes two authentication options. In one, the subscriber 607A-N may select, as shown at 1302, to sign in utilizing previously established external access credentials, preferably in the form of an ID and password combination. It should be noted that, as desired, the alternate authentication query page 1300 could include fields to enter external access credentials, though such is not shown in FIG. 13. In the other, as shown in 1303, the subscriber 607A-N enters funding account information 1303A and an e-mail address 1303B. It should be understood that while in exemplary FIG. 13 both a Routing Transit Number (RTN) and an account number are requested from the authenticating subscriber, it is not required that both pieces of information be requested. Preferably, the minimum piece of funding account information required is an account number. Further, other information associated with the authenticating subscriber 607A-N could be requested in addition to or instead of funding account information and/or e-mail information.

At step 1310 the authenticating subscriber 607A-N selects an authentication option. If option 1302 is chosen, operations continue with step 1312 in which conventional authentication is performed. In this process, the EBPSP processor 703 determines if the subscriber-provided external access credentials are stored in the participant profile database. Thus, if the subscriber 607A-N has previously enrolled with the EBPSP 601 for payments, from any direct log on site associated with the EBPSP 601, and the subscriber 607A-N both recognizes this fact and has external access credentials from that enrollment, the subscriber 607A-N can access the Universal Payment functionality by entering that external access credentials associated with that enrollment.

However, if the subscriber 607A-N does not recognize that he or she has previously enrolled with the EBPSP 601, was not provided external access credentials (that could be, as desired, equivalent to internal access credentials also associated with this subscriber 607A-N), or has not previously enrolled with the EBPSP 601 (in which case the subscriber 607A-N is actually an enrolling subscriber), the subscriber selects option 1303. The subscriber-provided funding account and e-mail address information is transmitted to the EBPSP 601 after activation of link 1304. After receipt by the EBPSP 601, and EBPSP processor 703 then compares the received information to information stored in the participant profile database, step 1315. The EBPSP processor 703 determines if a match is found to the subscriber information, step 1317. If so, operations continue with optional step 1320. In optional step 1320 the subscriber's external access credentials, if any, are provided back to the subscriber 607A-N. Optional step 1320 may be performed in those situations in which the subscriber 607A-N has previously enrolled for payment functionality through a biller (or payee) branded site that participates in direct log on. This information may be provided in-session or out-of-band. It should be noted that it is not required that, when a subscriber 607A-N is associated with external access credentials, that the subscriber 607A-N be reminded of that external access credentials.

At step 1323 the subscriber 607A-N is matched with the EBP participant (source) having handed-off the user session, as necessary. That is, if the handing-off site is a site that has chosen to practice consolidated log on, internal access credentials that associate the handing-off site with this subscriber 607A-N are stored in the participant profile database in association with enrollment information for this subscriber 607A-N. If internal access credentials were not included in the hand-off, step 1323 also includes the subscriber's internal access credentials (generated by the EBPSP 601 in such a case) being provided back to the consolidated log on source. Optional step 1323 has the benefit of, in the future, the subscriber 607A-N not being presented an authentication page for this consolidated log on site. Rather, the handing off site will include the internal access credentials in passed hand-off parameters, the passed internal access credentials will be matched to the stored subscriber information, and the subscriber 607A-N will be authenticated without an alternate authentication query page 1300 being presented to the subscriber 607A-N.

If at step 1317 it is determined that a match does not exist, operations continue with step 1328 in which the subscriber 607A-N is enrolled to access the services of the EBPSP 601. This, as necessary, will require the capture of additional information from the subscriber in another enrollment UI screen, presented by the EBPSP 601. If the source site practices consolidated log on, this includes storing subscriber internal access credentials for this source in the participant profile database in association with enrollment information associated with this subscriber 607A-N, and optionally passing the internal access credentials back to the source if they were not received from the source, i.e. if internal access credentials generated by the EBPSP 601. If the source site practices direct log on, enrollment includes associating the subscriber 607A-N with external access credentials, preferably chosen by the subscriber, and storing the same in association with subscriber enrollment information in the participant profile database. It should be recognized that some required enrollment information (funding account and email ID) has already been captured via page 1300.

FIGS. 14A-14F depict various processing and informational flows associated with enrolling and/or authenticating a subscriber 607A-N when a handoff to the EBPSP 601 is from a biller-direct biller-hosted source site. Of course, it will be recognized that the flows and processing of FIGS. 14A-14F could be associated with enrolling and/or authenticating a subscriber 607A-N when the subscriber 607A-N accesses Universal Payment functionality of the EBPSP 601 from another type of source site, such as a managed payee site, sponsor site, retailer site, or site hosted by the EBPSP 601. Further, it will be recognized that the flows and processing of FIGS. 14A-14F could be associated with enrolling and/or authenticating a subscriber 607A-N when the subscriber 607A-N accesses other EBP functionality, such as bill presentment, from a source site.

Figure 14A:
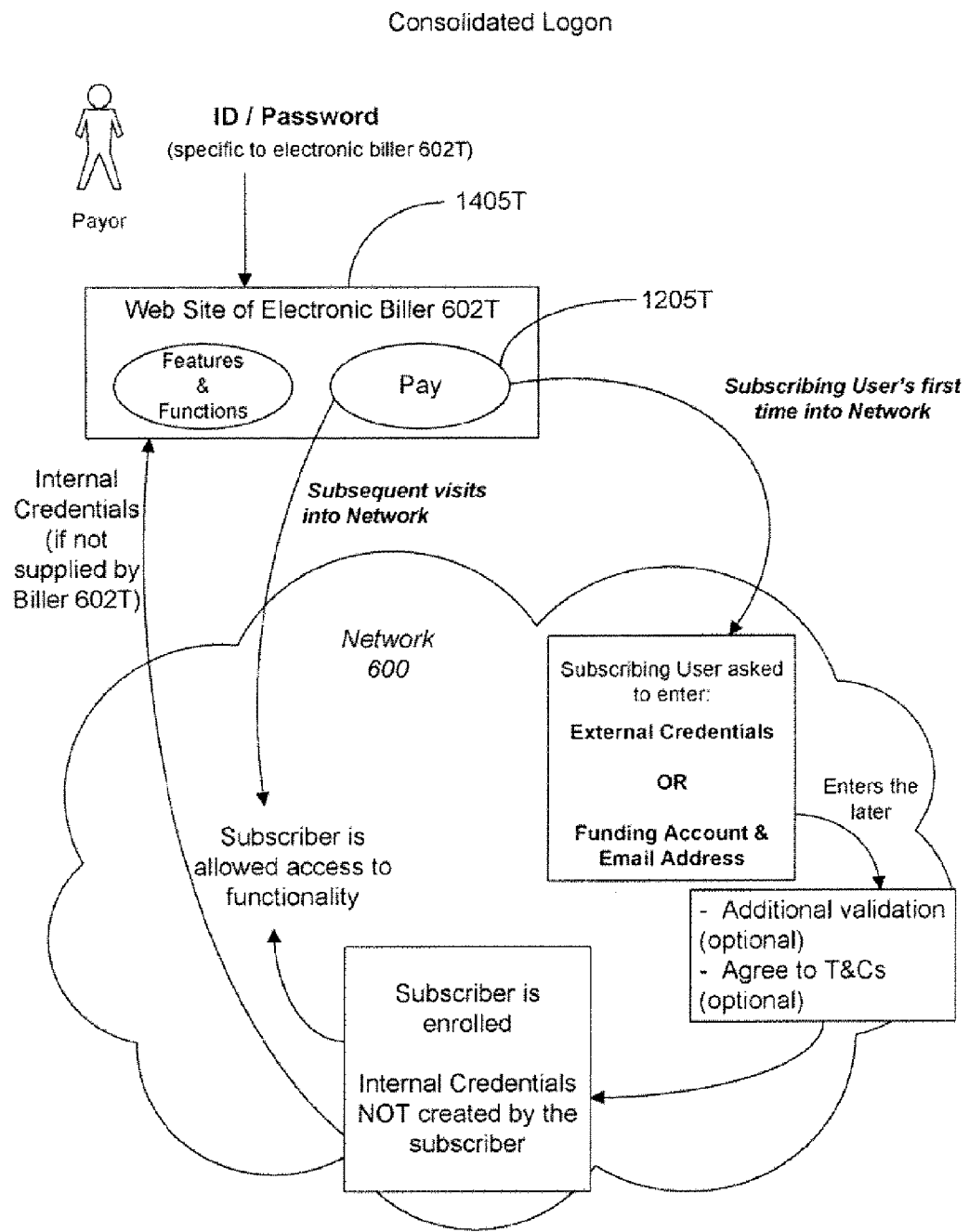
FIGS. 14A-14F are simplified flow diagrams of operations of the Universal Payments functionality in accordance with certain aspects of the present invention.

FIG. 14A is associated with a subscriber 607A-N (shown in the Figure as 'payor') initially enrolling with the EBPSP 601 from a biller direct site that utilizes consolidated log on. The subscriber 607A-N accesses the Web site 1405T of electronic biller 602T with a unique biller 602T-specific ID/password for accessing site 1405T. As shown in FIGS. 14A-14F and described in this preferred embodiment, the biller-specific ID/password combination used to access the biller site in each of FIGS. 14A-14F is different from any access credentials associated with the Universal Payments functionality, including internal access credentials associated with sites practicing consolidated log on or external credentials usable by the subscriber 607A-N in a direct log on context. Thus, in the case of FIG. 14A, the access credentials passed by the biller site 1405T to the EBPSP 601 in a consolidated log on to allow access to Universal Payment functionality are different than the biller-specific ID/password the subscriber 607A-N explicitly entered to gain access to the biller site 1405T. However, as desired, this does not necessarily have to be the case. The biller site 1405T could internal access credentials consisting of all or a subset of the biller-specific ID/password combination used to gain access to the biller site 1405T, or associated user-identifying information, to the EBPSP 601, and the EBPSP 601 could store these values in association with an existing account at the EBPSP 601 or, failing that, present the authentication page. That is, internal access credentials could be based upon a biller-specific ID/password combination.

The first time the subscriber 607A-N selects a pay link 1205T from the Web site 1405T of electronic biller 602T a handoff from electronic biller 602T either will not include internal access credentials for the subscriber 607A-N to access Universal Payment functionality (if it is desired that the EBPSP 601 generate and provide access credentials back to the source site), or will include internal access credentials unknown to the EBPSP 601 because this is a first hand-off of this subscriber 607A-N from Electronic Biller 602T. In either situation, the EBPSP will not initially recognize the subscriber 607A-N. Accordingly, an alternate authentication query screen having the alternative authentication options, as in FIG. 13, discussed above, is presented to the subscriber 607A-N by the Universal Payment functionality of the EBPSP 601. Since this is the first time the subscriber 607A-607N has ever entered network 600, the enrolling subscriber necessarily will provide funding account and e-mail address information. The EBPSP 601 performs enrollment processing, which can include, as desired, additional validation processing to determine if that subscriber 607A-N will be accepted for enrollment. Also, enrollment can include, as desired, the subscriber 607A-N agreeing to terms and conditions (T&Cs) of the payment service.

It should be noted that typically, due to a source site preference, internal access credentials associated with enrollment resulting from a consolidated log on handoff will be not be created by the enrolling subscriber. Rather, typically internal access credentials will be provided by the source site in the initial hand-off to the EBPSP 601. Alternatively, as desired, the EBPSP 601 could create the internal access credentials. In such a case, the internal access credentials would have to be provided back to the source site for future use. Furthermore, the internal access credentials will also typically, usually due to a source site preference, not be revealed to the enrolling subscriber 607A-N. In any event, the subscriber's enrollment information is stored in the participant profile database in association with a newly created account at the EBPSP 601. The stored information includes all information gathered during enrollment, including at least the funding account information and e-mail information, as well as the internal access credentials. It should be noted that the stored internal access credentials are also associated with electronic biller 602T. Thus, the next time that subscriber 607A-N activates the pay link 1205T of Electronic Biller 602T, that subscriber's internal access credentials with Electronic Biller 602T will be included in parameters passed at handoff. An EBPSP processor 703 will match the passed internal access credentials to those stored in association with this account in the participant profile database. As a result of the passed internal access credentials and matching, the subscriber 607A-N will not be presented the alternate authentication query page upon subsequent activation of a pay link 1205T from biller 602T Web site 1405T. Rather, the subscriber 607A-N will be granted access to EBPSP 601 functionality without an explicit (to the subscriber 607A-N) authentication.

Figure 14B:
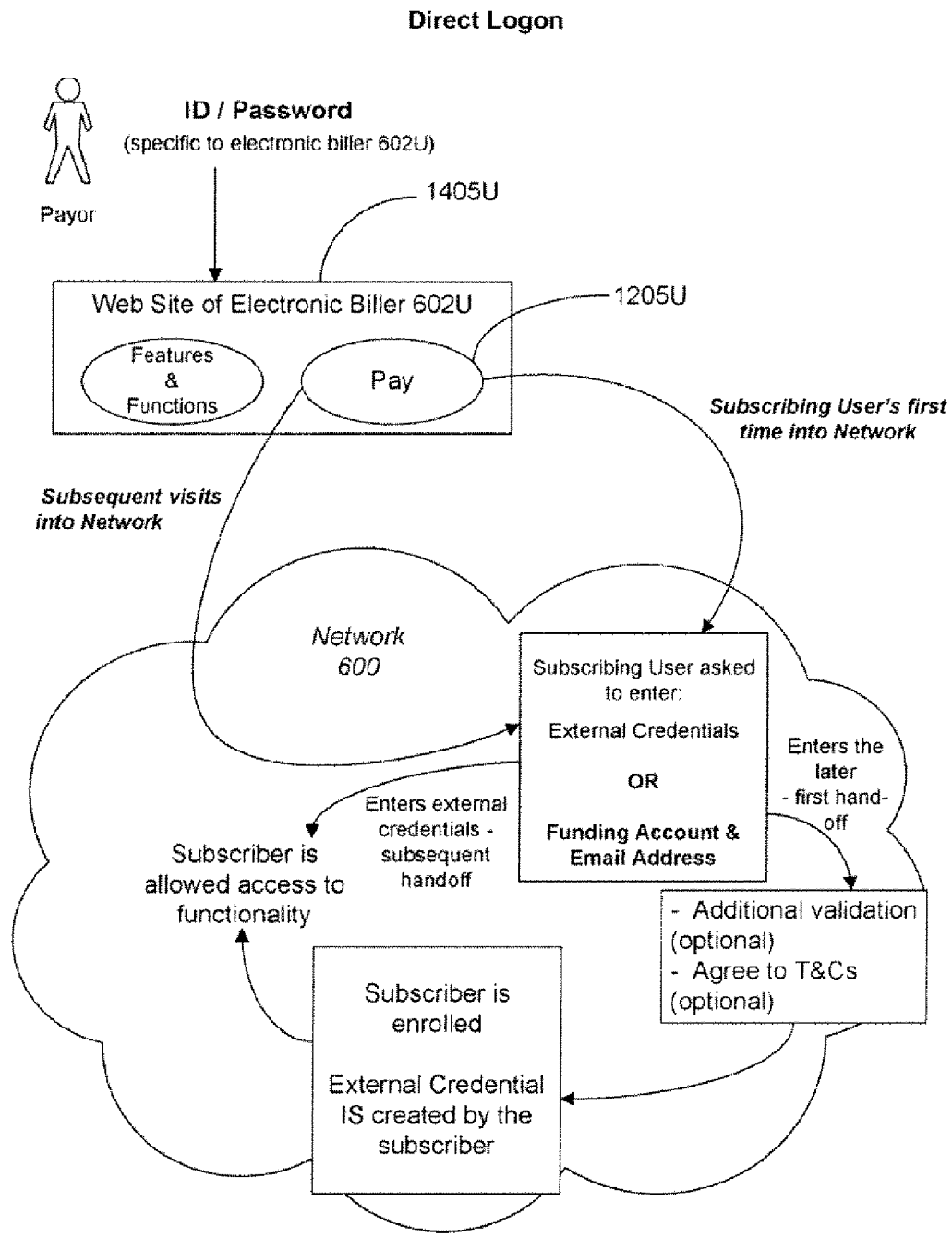

FIG. 14B is associated with a subscriber 607A-N (shown in the Figure as 'payor') initially enrolling with the EBPSP 601 from biller direct site 1405U that utilizes direct log on. The subscriber 607A-N accesses the Web site 1405U of electronic biller 602U with a unique biller 602U-specific ID/password for accessing site 1405U, as described above in relation to site 1405T. After the subscriber 607A-N selects a pay link 1205U from the Web site 1405U of electronic biller 602U a handoff from electronic biller 602U to the EBPSP 601 takes place. Because biller site 1405U is a direct log on site, no internal access credentials are passed as parameters.

An alternate authentication query screen having the alternative authentication options, as discussed above in relation to FIG. 13, is presented to the enrolling subscriber 607A-N by the Universal Payment functionality of the EBPSP 601. It should be noted that since this is a direct log on site, the dual authentication options will always be presented to a handed-off subscriber 607A-607N. Since this is the first time the enrolling subscriber 607A-607N has ever entered network 600, the enrolling subscriber 607A-N necessarily will provide funding account and e-mail address information. The EBPSP 601 performs enrollment processing, which can include, as desired, additional validation processing to determine if that enrolling subscriber 607A-N will be accepted for enrollment. Also, enrollment can include, as desired, the enrolling subscriber 607A-N agreeing to terms and conditions (T&Cs) of the payment service.

Because site 1405U is a direct log on site, typically the subscriber 607A-N will create his or her own external access credentials for accessing the Universal Payment functionality. Alternatively, as desired, another entity will create this external access credentials and provide it to the subscriber 607A-N. In any event, the subscriber's external access credentials will be stored in the participant profile database in association with the newly created account at the EBPSP 601 and the other enrollment information for this subscriber 607A-N. The next time that this subscriber 607A-N activates the pay link 1205U from Web site 1405U another alternate authentication query page will be presented to the subscriber 607A-N. In this next presentation, the subscriber 607A-N can enter either the established external access credentials, or funding account and e-mail address information. Whichever option is selected by the subscriber 607A-N, a match is made between the provided information (either external access credentials or funding account and e-mail information) and the stored participant profile database information associated with this subscriber 607A-N. After the match is made, this subscriber 607-N is allowed access to the functionality of the EBPSP 601. FIG. 14B assumes that the subscriber 607A-N remembers his external access credentials in a subsequent visit and enters the same to gain access to Universal payment functionality.

Figure 14C:
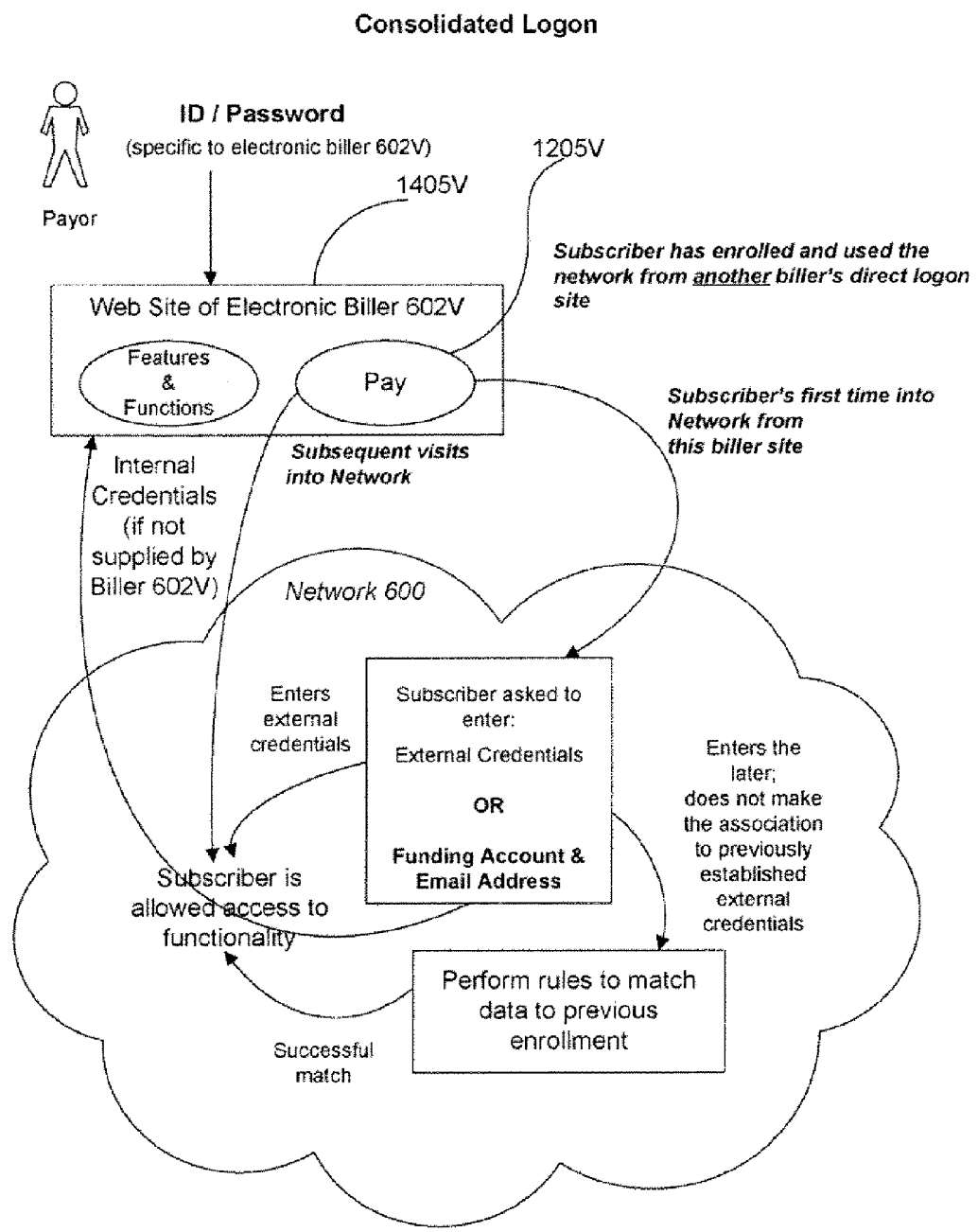

FIG. 14C is associated with a subscriber 607A-N (shown in the Figure as 'payor') having initially enrolled with the EBPSP 601 from a first biller direct site that utilizes direct log on, and then subsequently accessing payment functionality offered by the EBPSP 601 from a Web site associated with a electronic biller 602V that practices consolidated log on.

The subscriber 607A-N accesses the Web site 1405V of electronic biller 602V with a unique biller 602V-specific ID/password for accessing site 1405V. The first time the subscriber 607A-N selects a pay link 1205V from the Web site 1405V of electronic biller 602V, a handoff from electronic biller 602V will not include internal access credentials known to the EBPSP 601 because this is the first time this subscriber 607A-N has been handed off from site 1405V. If internal access credentials are provided in the handoff from electronic biller 602V, they would be unknown to EBPSP 601. If electronic biller 602V expects to use internal access credentials provided by EBPSP 601 in the handoff, it obviously would not yet have these to provide.

An alternate authentication query screen having the alternative authentication options, as discussed above in relation to FIG. 13, is presented to the subscriber 607A-N by the EBPSP 601. In one potential flow, since this is the first time the subscriber 607A-607N has entered network 600 from Web site 1405V, the subscriber 607A-N may not recognize that the previously established external access credentials are usable when payment functionality is accessed via Web site 1405V. As such, the subscriber 607A-N enters funding account and e-mail address information. This provided information is then matched against the stored information (in the participant profile database) from the previous enrollment. Thereafter, the subscriber 607A-N is granted access to the payment functionality. Any internal access credentials present in the handoff from electronic biller 602V are stored in association with the matched account and the source in the participant profile database. Alternatively, a set of internal access credentials scoped to the source is generated by the EBPSP 601 and stored in association with the matched account and the source in the participant profile database. Any EBPSP 601 generated internal access credentials are provided back to the source for use in subsequent handoffs of the subscriber 607A-N. Accordingly, in future handoffs the subscriber 607A-N will be successfully matched to the account and will be given access to payment functionality without having to be presented the alternate authentication query page. In another potential flow, if the subscriber 607A-N recognizes that the previous external access credentials are usable, that is supplied by the subscriber 607A-N, and thereafter access to the payment functionality is granted.

Figure 14D:
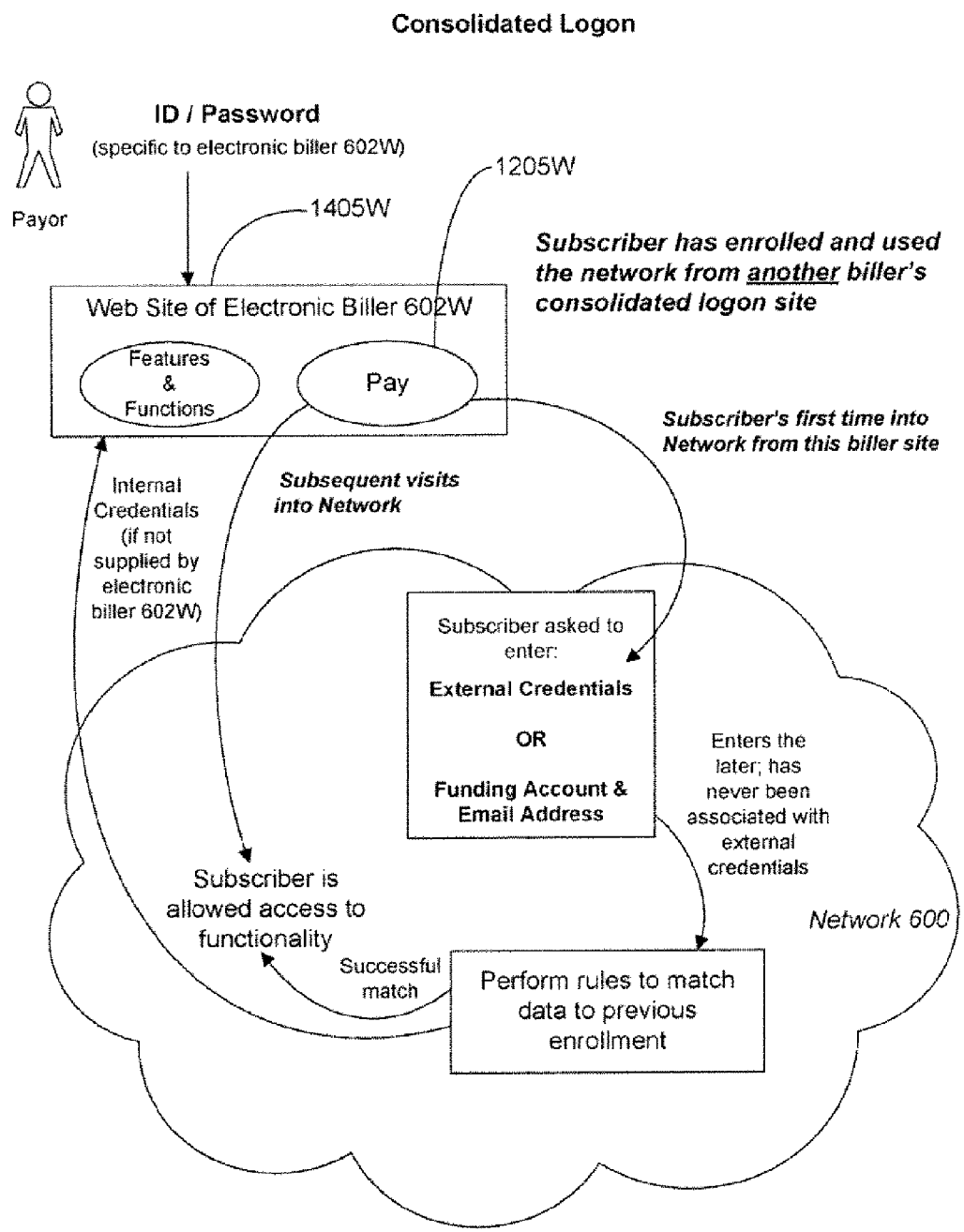

FIG. 14D is associated with a subscriber 607A-N (shown in the Figure as 'payor') having initially enrolled with the EBPSP 601 from a first biller direct site that utilizes consolidated log on, and then subsequently accessing payment functionality offered by the EBPSP 601 from a Web site associated with a electronic biller 602W entity that also practices consolidated log on. In the initial enrollment, the subscriber 607A-N was not provided external access credentials because of the consolidated log on enrollment processing.

The subscriber 607A-N accesses the Web site 1405W of electronic biller 602W with a unique biller 602W-specific ID/password for accessing site 1405W. The first time the subscriber 607A-N selects a pay link 1205W from the Web site 1405W of electronic biller 602W a handoff from electronic biller 602W does not include internal access credentials known to the EBPSP 601 because this subscriber 607A-N has never before been handed-off from site 1405W, as will be understood from the discussion herein.

An alternate authentication query screen having the alternative authentication options, as discussed above in relation to FIG. 13, is presented to the subscriber 607A-N by the EBPSP 601. Since this is the first time the subscriber 607A-607N has entered network 600 from Web site 1405W, and has never been provided external access credentials, the subscriber 607A-N does not have external access credentials to present, and as such provides funding account and e-mail information.

This provided information (funding account and e-mail information) is then matched against the stored information in the participant profile database from the previous enrollment. Internal access credentials associating electronic biller 602W with this subscriber 607A-N, either obtained from the parameters in the handoff from electronic biller 602W or generated by the EBPSP 601, are stored in association with the already stored information associated with this subscriber 607A-N. However, no enrollment processing is required, i.e., no enrollment interaction with the subscriber 607A-N is required. After the matching, the subscriber 607A-N is granted access to the Universal Payment functionality. If internal access credentials were not received in the hand-off, they are provided by the EBPSP 601 to the electronic biller 602W for use in subsequent consolidated log ons of this subscriber 607A-N.

Figure 14E:
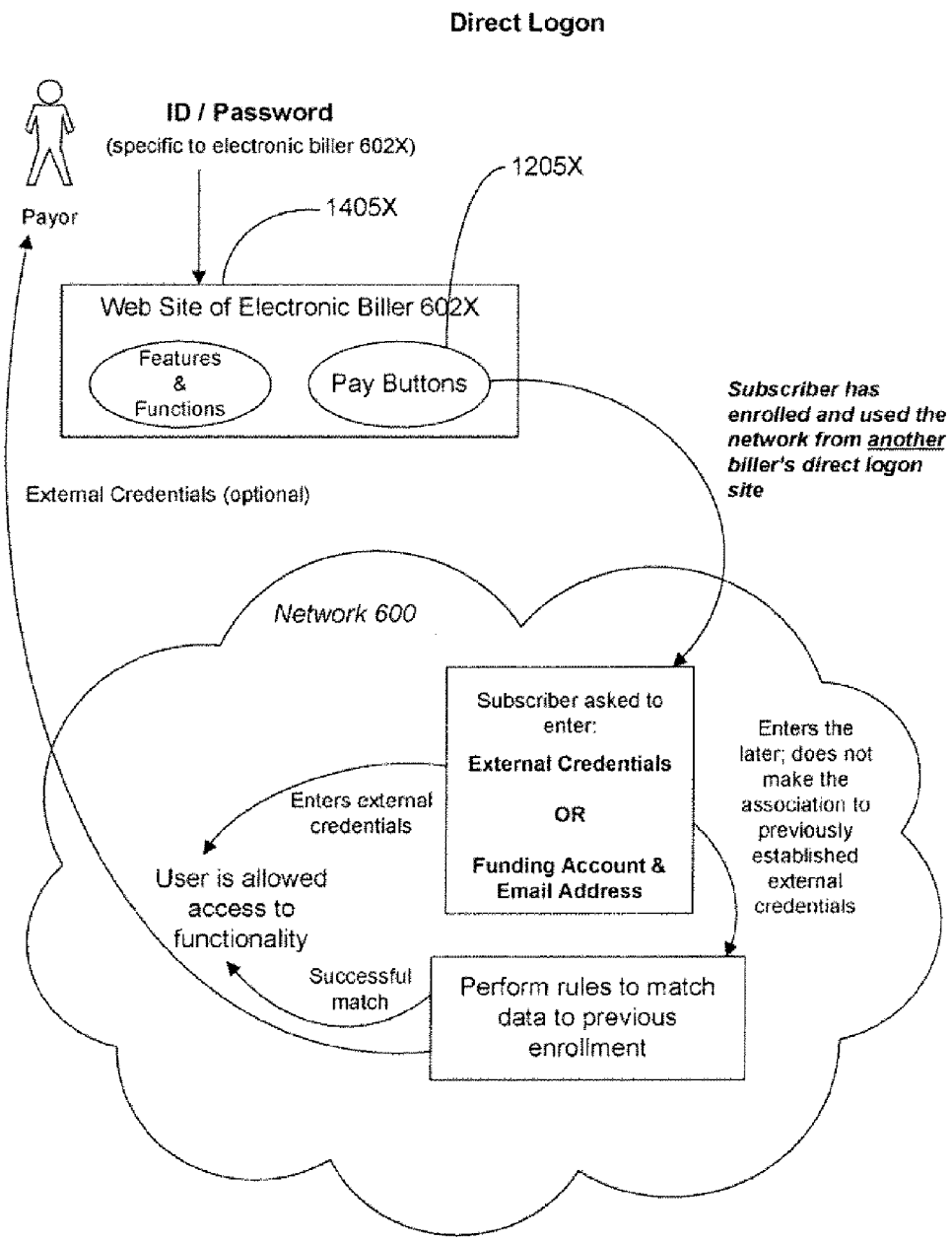

FIG. 14E is associated with a subscriber 607A-N (shown in the Figure as 'payor') having initially enrolled with the EBPSP 601 from a first biller direct site that utilizes direct log on, and then subsequently accessing payment functionality offered by the EBPSP 601 from a Web site associated with a electronic biller 602X that also practices direct log on. In the initial enrollment, the subscriber 607A-N obtained external access credentials. However, because the subscriber 607A-N is now accessing a different Web site from the one through which enrollment took place, the subscriber 607A-N does not recognize that the previously obtained external access credentials are usable at this different Web site, Web site 1405X in FIG. 14E.

The subscriber 607A-N accesses the Web site 1405X of electronic biller 602X with a unique biller 602X-specific ID/password for accessing site 1405X. This ID/password combination is not utilized to access the EBPSP 601. When the subscriber 607A-N selects a pay link 1205X from the Web site 1405X of electronic biller 602X a handoff from electronic biller 602X is made that does not include external access credentials for the subscriber 607A-N to access payment functionality because of the direct log on procedures.

An alternate authentication query screen having the alternative authentication options, as discussed above in relation to FIG. 13, is presented to the subscriber 607A-N by the EBPSP 601. Since this is the first time the subscriber 607A-607N has entered network 600 from Web site 1405X the subscriber 607A-N, in this example, provides funding account and e-mail address information instead of the previously assigned external access credentials. That is, the subscriber 607A-N does not recognize that the previous external access credentials can be utilized at Web site 1405X.

This provided information is then matched against the stored information in the participant profile database from the previous enrollment. No further enrollment processing is required. Thereafter, the subscriber 607A-N is granted access to the payment functionality. As desired, optionally the subscriber 607A-N can be reminded by the EBPSP 601 of the previous external access credentials. Thus, the next time the subscriber 607A-N accesses the EBPSP 601 from Web site 1405X, or any other participant site, he can provide the external access credentials through the alternate authentication query presentation, instead of funding account and e-mail information.

Figure 14F:
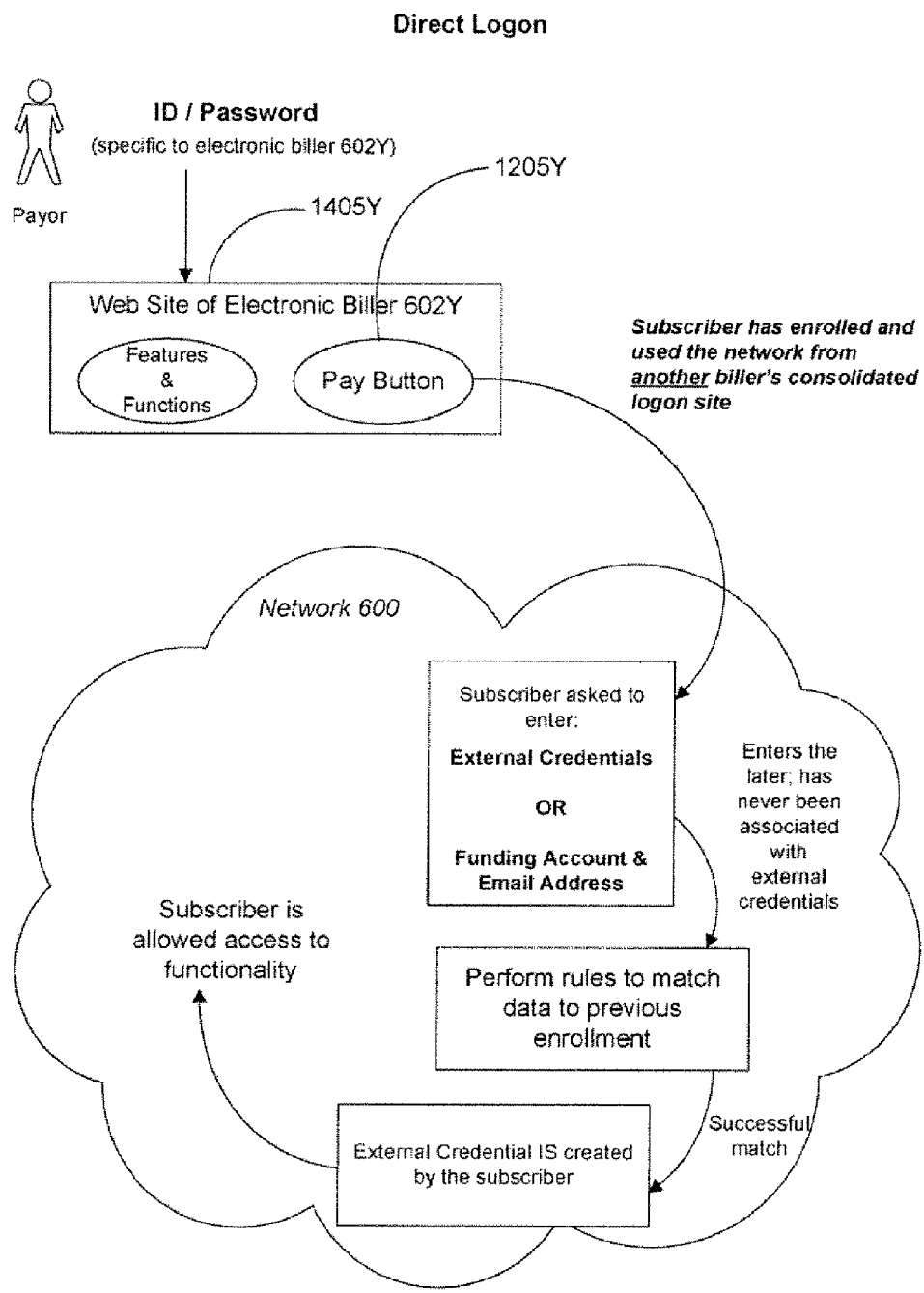

FIG. 14F is associated with a subscriber 607A-N (shown in the Figure as 'payor') having initially enrolled with the EBPSP 601 from a first biller direct site that utilizes consolidated log on, and then subsequently accessing payment functionality offered by the EBPSP 601 from a Web site associated with a electronic biller 602W entity that practices direct log on. In the initial enrollment, the subscriber 607A-N was not provided any external access credentials because of the consolidated log on.

The subscriber 607A-N accesses the Web site 1405Y of electronic biller 602Y with a unique biller 602Y ID/password combination for accessing site 1405Y. The first time the subscriber 607A-N selects a pay link 1205Y from the Web site 1405Y of electronic biller 602Y a handoff from electronic biller 602Y does not include any internal access credentials for the subscriber 607A-N to access payment functionality because this is a direct log on biller.

An alternate authentication query screen having the alternative authentication options, as discussed above in relation to FIG. 13, is presented to the subscriber 607A-N by the EBPSP 601. Since this is the first time the subscriber 607A-607N has entered network 600 from Web site 1405W, and has never established or been provided external access credentials, the subscriber 607A-N does not have external access credentials to present, and as such provides funding account and e-mail information.

This provided information is then matched against the stored information in the participant profile database (from the initial enrollment). After a match is made, this subscriber 607A-N is prompted to establish external access credentials, which is stored in association with the information from the initial enrollment, including internal access credentials associated with the previous enrollment from a consolidated site, in the participant profile database. However, no additional enrollment processing is required. Thereafter, the subscriber 607A-N is granted access to the Universal Payment functionality.

Whenever a subscriber 607A-N provides funding account and e-mail address information via an alternate authentication query screen, one of three possibilities exists. In one, none of the provided information matches stored information in the participant profile database. In such a case, that subscriber 607A-N must enroll. Beneficially, the provided funding account and e-mail information is not requested again during enrollment, as it has already been provided. In a second, all provided information matches and the subscriber 607A-N is allowed access to the Universal Payment functionality. In the third, only a portion of that provided information matches the stored information.

In the case in which only a portion of provided information matches stored information, the Universal Payment functionality, as desired, requests additional information from the subscriber 607A-N based upon the stored information. That is, the subscriber 607A-N is asked to provide at least a portion of other information gathered during enrollment and stored in the participant profile database, such as, but not limited to, a phone number, a birth date, a social security number. If the subscriber 607A-N correctly provides the additional information, that subscriber 607A-N is then be permitted access to the Universal Payment functionality reusing the existing account.

Also as desired, during enrollment a subscriber 607A-N could be requested to supply an answer to a hint question, as is known in the prior art. The supplied question/answer combination is stored in the participant profile database in association with the account. In a subsequent attempt to match against the account, if a only a portion of the provided information matches, the subscriber 607A-N is requested to supply an answer to the stored question. If the supplied answer matches, the subscriber 607A-N would be allowed access to the Universal Payment functionality, reusing the existing account.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A method, comprising executing computer-implemented instructions performed by one or more processors to:

receive, by a service provider via a first communication session established between the service provider and a customer of a first partner of the service provider, enrollment information associated with the customer, wherein the first communication session is established as a result of the customer selecting a first link presented to the customer by the first partner;

enroll, the customer as a subscriber of the service provider based on the received enrollment information, wherein enrolling includes establishing an account for the subscriber with the service provider and storing information associated with the subscriber, wherein the stored information including the enrollment information and access credentials;

receive, by the service provider via a second communication session established between the service provider and the subscriber, a request to access an electronic commerce service of the service provider, wherein the second communication session is established as a result of the subscriber selecting a second link presented to the subscriber by a second partner of the service provider;

receive, from the subscriber via the second communication session and subsequent to receiving the request, subscriber identifying information, wherein the subscriber identifying information does not comprise the access credentials;

match the received subscriber identifying information with the stored enrollment information; and grant the subscriber access to the electronic commerce service of the service provider through the previously established account.

2. The method of claim 1, wherein the access credentials are further associated with at least one of (i) the first partner or (ii) the service provider.

3. The method of claim 1, wherein the access credentials are unknown to the subscriber.

4. The method of claim 1, further comprising executing additional computer-implemented instructions to:

transmit the access credentials to the subscriber responsive to matching the received subscriber identifying information with the stored enrollment information.

5. The method of claim 1, further comprising executing additional computer-implemented instructions to:

transmit, to the subscriber and, responsive to the request, an authentication query presentation comprising at teas1 one prompt for subscriber identifying information, wherein the subscriber identifying information is received responsive to transmitting the authentication query presentation.

6. The method of claim 5, wherein the access credentials are first access credentials, and the request includes second access credentials, and further comprising executing further computer-implemented instructions to:

determine that the second access credentials are unknown to the service provider, wherein the authentication query presentation is transmitted responsive to determining that the second access credentials are unknown to the service provider.

7. The method of claim 1, wherein the access credentials are first access credentials, and the request includes second access credentials, and further comprising executing additional computer-implemented instructions to:

determine that the second access credentials are unknown to the service provider; and store the second access credentials in association with the stored enrollment information.

8. The method of claim 1, wherein the access credentials are first access credentials, and further comprising executing additional computer-implemented instructions to:

generate second access credentials responsive to matching the received subscriber identifying information with the stored enrollment information; and store the second access credentials in association with the stored enrollment information.

9. The method of claim 8, further comprising executing further computer-implemented instructions to:

transmit the second access credentials to the second partner.

10. The method of claim 1, wherein the subscriber identifying information comprises at least one of (i) an email address or (iii) funding account information.

11. The method of claim 1, further comprising executing additional computer-implemented instructions to:

transmit, to the subscriber subsequent to granting the subscriber access to the service provider, a transaction history presentation comprising a transaction associated with the first partner.

12. A system, comprising:

at least one communications interface associated with a site of a service provider and that (i) receives, via a first communication session established between the service, provider and a customer of a first partner of the service provider, enrollment information associated with the customer, wherein the first communication session is established as a result of the customer selecting a first link presented to the customer by the first service provider, and wherein the enrollment information facilitates the enrollment of the customer as a subscriber of the service provider and the establishment of access credentials for the subscriber, (ii) receives via a second communication session established between the service provider and the subscriber, a request to access an electronic, commerce service of the service provider, wherein the second communication session is established as a result of the subscriber selecting a second link presented to the subscriber by a second partner of the service provider, and (iii) receives, from the subscriber via the second communication session and subsequent to receiving the request, subscriber identifying information, wherein the subscriber identifying information does not comprise the access credentials; and at least one processor associated with the service provider and programmed (i) to enroll the subscriber with the service provider during the first communication session to establish an account for the subscriber with the service provider, (ii) to store, in a memory, enrollment information associated with the subscriber, including the access credentials for the subscriber, (iii) to receive the subscriber identifying information from the at least one communications interface, (iv) to match the received subscriber identifying information with the stored enrollment information, and (v) to grant the subscriber access to the electronic commerce service of the service provider through the previously established account.

13. The system of claim 12, wherein the access credentials are further associated with at least one of (i) the first partner or (it) the service provider.

14. The system of claim 12, wherein the access credentials are unknown to the subscriber.

15. The system of claim 12, wherein the at least one communications interface further transmits the access credentials to the subscriber responsive to the at least one processor matching the received subscriber identifying information with the stored enrollment information, and wherein the at least one processor is further operable to direct the at least one communications interface to transmit the access credentials to the subscriber.

16. The system of claim 12, wherein:

the at least one communications interlace further transmits, to the subscriber and responsive to the request, an authentication query presentation comprising at least one prompt for subscriber identifying information, the at least one processor is further programmed to direct the communications interlace to transmit the authentication query presentation, and the subscriber identifying information is received responsive to transmitting the authentication query presentation.

17. The system of claim 16, wherein:

the access credentials are first access credentials, the request includes second access credentials the at least one processor is further programmed to determine that the second access credentials are unknown to the service provider, and the authentication query presentation is transmitted by the at least one communications interface responsive to the at least one processor determining that the second access credentials are unknown to the service provider.

18. The system of claim 12, wherein:

the access credentials are first access credentials, the request includes second access credentials, and the at least one processor is further programmed (i) to determine that the second access credentials are unknown to the service provider, and (ii) to store the second access credentials in association with the stored enrollment information.

19. The system of claim 12, wherein:

the access credentials are first access credentials, and the at least one processor is further programmed (i) to generate second access credentials responsive to matching the received subscriber identifying information with the stored enrollment information, and (ii) to store the second access credentials in association with the stored enrollment information.

20. The system of claim 19, wherein the at least one communications interface further transmits the second access credentials to the second partner.

21. The system, of claim 12, wherein the subscriber identifying information comprises at least one of (i) an email address or (iii) funding account information.

22. The system of claim 12, wherein the at least one communications interface further transmits to the at least one subscriber subsequent to the processor granting the subscriber access to the service provider, a transaction history presentation comprising a transaction associated with the first partner.

* * * * *